United States Patent
Hama et al.

(10) Patent No.: US 9,311,035 B2
(45) Date of Patent: Apr. 12, 2016

(54) PRINT SYSTEM, PRINT SERVER, PRINT CONTROL METHOD, AND NON-TRANSITORY COMPUTER-READABLE RECORDING MEDIUM ENCODED WITH PRINT CONTROL PROGRAM

(71) Applicant: Konica Minolta, Inc., Chiyoda-ku, Tokyo (JP)

(72) Inventors: Kenro Hama, Amagasaki (JP); Katsuhiko Akita, Amagasaki (JP); Daisuke Sakiyama, Kawanishi (JP); Toshikazu Kawaguchi, Kobe (JP); Kazusei Takahashi, Nishinomiya (JP); Yuki Asai, Itami (JP); Takeshi Maekawa, Osaka (JP); Yuji Tanaka, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/796,369

(22) Filed: Jul. 10, 2015

(65) Prior Publication Data
US 2016/0011834 A1    Jan. 14, 2016

(30) Foreign Application Priority Data

Jul. 14, 2014   (JP) .................................. 2014-144206

(51) Int. Cl.
*G06F 3/12* (2006.01)

(52) U.S. Cl.
CPC ............ *G06F 3/1268* (2013.01); *G06F 3/1285* (2013.01)

(58) Field of Classification Search
None
See application file for complete search history.

(56) References Cited

U.S. PATENT DOCUMENTS

| 2012/0120438 A1* | 5/2012 | Sato ...................... G06F 3/1204 358/1.15 |
| 2014/0092420 A1* | 4/2014 | Fukudome ........... H04N 1/0023 358/1.14 |

FOREIGN PATENT DOCUMENTS

JP    2012-103966 A    5/2012

* cited by examiner

*Primary Examiner* — Marcus T Riley
(74) *Attorney, Agent, or Firm* — Buchanan Ingersoll & Rooney PC

(57) ABSTRACT

A print system includes a print server and a plurality of image forming apparatuses. The print server externally receives a print job, extracts a print job that includes user identification information included in a download request received from any of the image forming apparatuses, transmits the print job to an image forming apparatus that transmits the download request, detects a progress status of the print job executed by a first image forming apparatus that receives the print job, detects the print job transmitted to the first image forming apparatus as a job in progress in response to reception of a download request from a second image forming apparatus, splits the job in progress into a first split job and a second split job, transmits the second split job to the second image forming apparatus, and transmits an end command to the first image forming apparatus.

13 Claims, 13 Drawing Sheets

PRINT SYSTEM, PRINT SERVER, PRINT CONTROL METHOD, AND NON-TRANSITORY COMPUTER-READABLE RECORDING MEDIUM ENCODED WITH PRINT CONTROL PROGRAM

This application is based on Japanese Patent Application No. 2014-144206 filed with Japan Patent Office on Jul. 14, 2014, the entire content of which is hereby incorporated by reference.

BACKGROUND OF THE INVENTION

1. Field of the Invention

The present invention relates to a print system, a print server, a print control method, and a non-transitory computer-readable recording medium encoded with a print control program. More specifically, the present invention relates to a print system including a print server and a plurality of image forming apparatuses, a print server that stores a print job and transmits the stored print job in response to a request from an image forming apparatus, a print control method executed in the print server, and a non-transitory computer-readable recording medium encoded with a print control program.

2. Description of the Related Art

A printing method is known, in which a print job is stored in a print server, and an image forming apparatus such as an MFP (Multi Function Peripheral) downloads the print job from the print server and then executes the print job to form an image. This printing method is generally called pull printing. In a state in which a plurality of MFPs are installed, the user can select any one of the MFPs for pull printing.

When a print job includes a large number of sheets of paper to be printed, it takes a long time to complete the print job with a single MFP. Therefore a plurality of MFPs may share a single print job and execute the job.

For example, Japanese Patent Laid-Open No. 2012-103966 describes an image forming system including a server device that manages print data and a plurality of image forming apparatuses connected to the print server for processing a print job provided by the print server. The server device includes splitting means for, if print data is not split, splitting the print data into a plurality of print jobs in accordance with an index value of the processing time and transmission means for, when a request for print data is received from the image forming apparatuses, transmitting one of the print jobs related to the print data to an image forming apparatus that requests the print data. The image forming apparatuses include request means for requesting print data from the sever device and execution means for executing processing of the print job received in response to the request for print data and transmitting a notice to the server device to indicate that the processing of the print job is completed. The transmission means transmits a print job not yet processed among the print jobs to the image forming apparatus every time the notice indicating completion of the processing of the print job is received from the image forming apparatus, until the processing of the print data is completed.

However, in the image forming system described in Japanese Laid-Open Patent Publication No. 2012-103966, the server device successively transmits a plurality of sections formed by splitting a print job. When those sections are executed in two image forming apparatuses, a time lag occurs between the time when one of the sections is finished and the time when the other is finished. At the two image forming apparatuses, a plurality of print jobs are not executed in order, and stacks of paper are output in random order and have to be arranged in order.

SUMMARY OF THE INVENTION

According to an aspect of the present invention, a print system includes a print server and a plurality of image forming apparatuses. A processor of the print server executes: a server-side receiving step of externally receiving a print job including user identification information for identifying a user and image data; a server-side extracting step of, in response to reception of a download request including user identification information from any one of the plurality of image forming apparatuses, extracting a print job that includes user identification information identical with the user identification information included in the received download request from among one or more print jobs received in the server-side receiving step; a print job transmitting step of transmitting the extracted print job to, among the plurality of image forming apparatuses, an image forming apparatus that has transmitted the download request; a progress status detecting step of detecting a progress status in which, among the plurality of image forming apparatuses, a first image forming apparatus that has received the print job executes the print job; a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress; a splitting step of, if the job in progress is detected, splitting the job in progress into a first split job that is a preceding section and a second split job that is a following section, based on the progress status of the job in progress; a split job transmitting step of transmitting the second split job to the second image forming apparatus; and an end command transmitting step of transmitting an end command to terminate the job in progress at a location defined by the first split job to the first image forming apparatus. A processor of each of the plurality of image forming apparatuses executes: a user detecting step of detecting a user; a download request step of transmitting a download request including user identification information of the user detected in the user detecting step to the print server; and a job executing step of, if the print job is received from the print server in response to transmission of the download request, executing the print job, and if the second split job is received from the print server, executing the second split job. The job executing step includes a job cancel step of terminating execution of the print job at a location defined by the end command if the end command is received from the print server while the print job is being executed.

According to another aspect of the present invention, a print system includes a print server and a plurality of image forming apparatuses. A processor of the print server executes: a server-side receiving step of externally receiving a print job including user identification information for identifying a user and image data; a server-side extracting step of, in response to reception of a download request including user identification information from any one of the plurality of image forming apparatuses, extracting a print job that includes user identification information identical with the user identification information included in the received download request from among one or more print jobs received in the server-side receiving step; a print job transmitting step of, in response to reception of the download request from a first image forming apparatus among the plurality of image forming apparatuses, transmitting the extracted print job to the first image forming apparatus; a progress status detecting step of detecting a progress status in which, among the plurality of image forming apparatuses, a first image forming apparatus that has received the print job executes the print job; a job-in-progress detecting step of, in response to reception of a download request from a second image forming apparatus different from the first image forming apparatus among the plurality of image forming apparatuses, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress; and a job-in-progress information transmitting step of, if the job in progress is detected, transmitting job-in-progress information including the job in progress and device identification information for identifying the first image forming apparatus to the second image forming apparatus. A processor of each of the plurality of image forming apparatuses executes: a user detecting step of detecting a user; a download request step of transmitting a download request including user identification information of the user detected in the user detecting step to the print server; and a job executing step of, if the print job is received from the print server in response to transmission of the download request, executing the print job, and if the second split job is received from the print server, executing the second split job. A processor of the second image forming apparatus executes: a progress status acquiring step of, if the job-in-progress information is received from the print server, acquiring a progress status of executing the job in progress from the first image forming apparatus specified by the device identification information included in the job-in-progress information; a splitting step of splitting the job in progress into a first split job that is a preceding section and a second split job that is a following section, based on the acquired progress status of the job in progress; a split job executing step of executing the second split job; and an end command transmitting step of transmitting an end command to terminate the job in progress at a location defined by the first split job to the first image forming apparatus. The processor of the first image forming apparatus further executes a job cancel step of terminating execution of the job in progress at a location defined by the end command if the end command is received from the second image forming apparatus.

According to a further aspect of the present invention, a print server includes a processor that executes: a server side receiving step of externally receiving a print job including user identification information for identifying a user and image data; a server-side extracting step of, in response to reception of a download request including user identification information from any one of the plurality of image forming apparatuses, extracting a print job that includes user identification information identical with the user identification information included in the received download request from among one or more print jobs received in the server-side receiving step; a print job transmitting step of transmitting the extracted print job to, among the plurality of image forming apparatuses, an image forming apparatus that has transmitted the download request; a progress status detecting step of detecting a progress status in which, among the plurality of image forming apparatuses, a first image forming apparatus that has received the print job executes the print job; a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress; a splitting step of, if the job in progress is detected, splitting the job in progress into a first split job that is a preceding section and a second split job that is a following section, based on the progress status of the job in progress; a split job transmitting step of transmitting the second split job to the second image forming apparatus; and an end command transmitting step of transmitting an end command to terminate the job in progress at a location defined by the first split job to the first image forming apparatus.

According to a still further aspect of the present invention, a print control method performed in a print server includes: a server-side receiving step of externally receiving a print job including user identification information for identifying a user and image data; a server-side extracting step of, in response to reception of a download request including user identification information from any one of a plurality of image forming apparatuses, extracting a print job that includes user identification information identical with the user identification information included in the received download request from among one or more print jobs received in the server-side receiving step; a print job transmitting step of transmitting the extracted print job to, among the plurality of image forming apparatuses, an image forming apparatus that has transmitted the download request; a progress status detecting step of detecting a progress status in which, among the plurality of image forming apparatuses, a first image forming apparatus that has received the print job executes the print job; a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress; a splitting step of, if the job in progress is detected, splitting the job in progress into a first split job that is a preceding section and a second split job that is a following section, based on the progress status of the job in progress; a split job transmitting step of transmitting the second split job to the second image forming apparatus; and a command transmitting step of transmitting an end command to terminate the job in progress at a location defined by the first split job to the first image forming apparatus.

According to yet another aspect of the present invention, a non-transitory computer-readable recording medium is encoded with a print control program executed in a computer that controls a print server. The program causes the computer to execute: a server-side receiving step of externally receiving a print job including user identification information for identifying a user and image data; a server-side extracting step of, in response to reception of a download request including user identification information from any one of a plurality of image forming apparatuses, extracting a print job that includes user identification information identical with the user identification information included in the received download request from among one or more print jobs received in the server-side receiving step; a print job transmitting step of transmitting the extracted print job to, among the plurality of image forming apparatuses, an image forming apparatus that has transmitted the download request; a progress status detecting step of detecting a progress status in which, among the plurality of image forming apparatuses, a first image forming apparatus that has received the print job executes the print job; a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress; a splitting step of, if the job in progress is detected, splitting the job in progress into a first split job that is a preceding section and a second split job that is a following section, based on the progress status of the job in progress; a split job transmitting step of transmitting the second split job to the second image forming apparatus; and a command transmitting step of transmitting an end command to terminate the job in progress at a location defined by the first split job to the first image forming apparatus.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
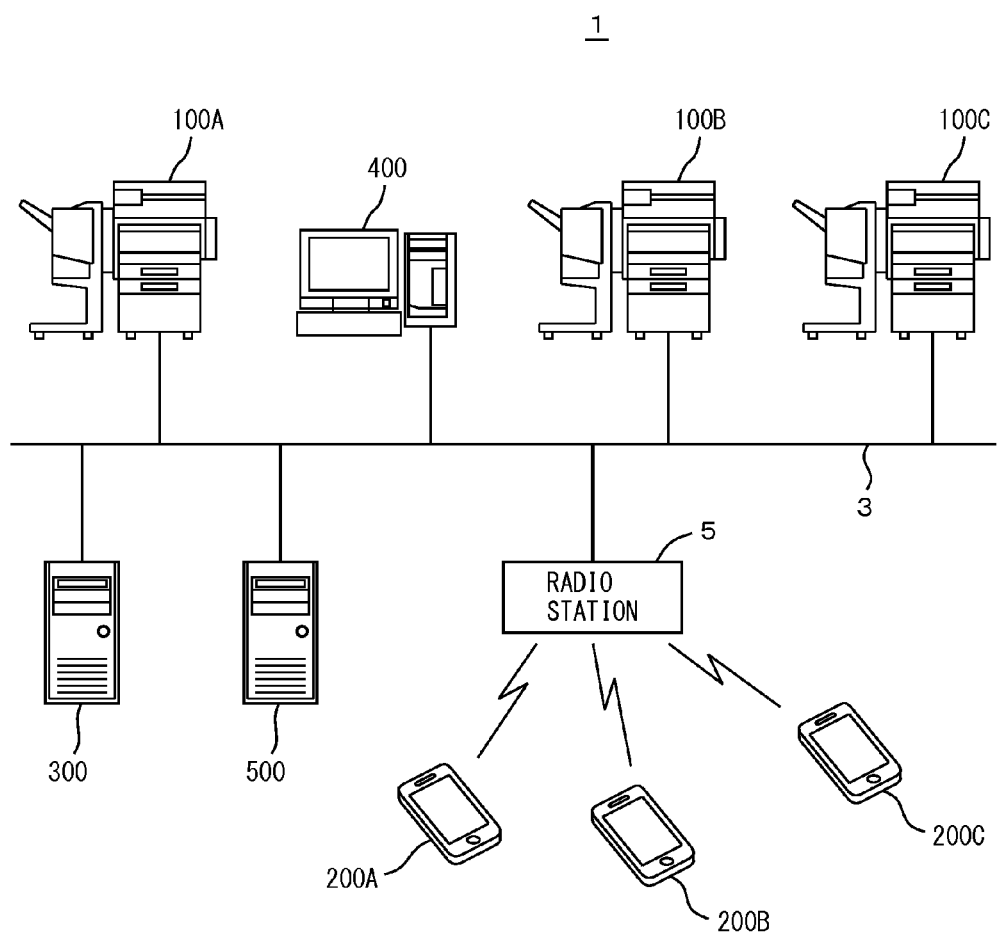
FIG. 1 is a diagram showing an overview of a print system according to an embodiment of the present invention.

Embodiments of the present invention will be described below in conjunction with the figures. In the following description, the same parts are denoted with the same reference numerals. Their names and functions are also the same. A detailed description thereof is therefore not repeated.

First Embodiment

FIG. 1 is a diagram showing an overview of a print system according to an embodiment of the present invention. Referring to FIG. 1, print system 1 includes Multi Function Peripherals (hereinafter referred to as "MFPs") 100A, 100B, 100C functioning as image forming apparatuses, a print server 300, a personal computer (hereinafter referred to as "PC") 400, an authentication server 500, a radio station 5, and portable information devices 200A, 200B, 200C. MFPs 100A, 100B, 100C, PC 400, print server 300, and authentication server 500 are connected to network 3. Portable information devices 200A, 200B, 200C are connected to network 3 through radio station 5.

Network 3 is a Local Area Network (LAN), either wired or wireless. Network 3 is not limited to a LAN but may be a Wide Area Network (WAN), Public Switched Telephone Network (PSTN), the Internet, or the like.

The functions of MFPs 100A, 100B, 100C may be the same or different but MFPs 100A, 100B, 100C at least include the image forming function for forming an image on a sheet such as paper based on image data. MFPs 100A, 100B, 100C may additionally include at least one of the image scanning function of scanning a document and outputting image data, the image processing function of processing image data, the post-processing function of performing punching, sorting, or other processing on paper having an image formed thereon, and a facsimile transmitting/receiving function. Although MFPs 100A, 100B, 100C may not have the same functions, MFP 100A has at least one of the functions of the other MFPs 100B, 100C in the example described here.

Portable information devices 200A, 200B, 200C are computers carried by users, such as smartphones and PDAs (Personal Digital Assistants). Here, the users who operate portable information devices 200A, 200B, 200C are set in advance. In other words, the telephone numbers or IP addresses for identifying portable information devices 200A, 200B, 200C are associated one-to-one with user identification information for identifying the users. The hardware configurations and functions of portable information devices 200A, 200B, 200C are the same, and portable information device 200A will be taken as an example, unless otherwise specified. Here, portable information device 200A is a smartphone and has a wireless LAN function and a call function. Portable information device 200A thus can communicate with a mobile phone base station by radio to connect to a mobile phone network to make a call.

Portable information devices 200A, 200B, 200C each further include a data communication unit for performing short-range wireless communication with MFPs 100A, 100B, 100C. Portable information devices 200A, 200B, 200C each may function as an RFID (Radio Frequency Identification) tag. The RFID is attached to a nameplate or card worn by the user. In this case, wireless communication between the RFID and each of MFPs 100A, 100B, 100C may be communication using radio waves or electromagnetic waves as a communication medium such as the Bluetooth (registered trademark) standards or communication using infrared radiation as a communication medium such as the IrDA (Infrared Data Association) standards.

PC 400, print server 300, and authentication server 500 are general computers. In print system 1 in the present embodiment, pull printing is executed, in which a print job generated in PC 400 is temporarily stored in print server 300 and executed in any one of MFPs 100A, 100B, 100C. The overall functions of PC 400, print server 300, and authentication server 500 for executing pull printing will now be described. In a case where print server 300 also serves as authentication server 500, authentication server 500 is not necessary.

In FIG. 1, print system 1 includes three MFPs 100A, 100B, 100C. However, the number of MFPs is not limited and may be two or more. Print system 1 shown includes one PC 400 and three portable information devices 200A, 200B, 200C. However, the number is not limited and may be one or more.

In print system 1 in the present embodiment, a print job generated in PC 400 is stored in print server 300, and when the user specified by the user identification information included in the print job operates one of MFPs 100A, 100B, 100C, the stored print job is downloaded and executed by one of MFPs 100A, 100B, 100C that is operated by the user, on condition that the user is authenticated by authentication server 500. The pull printing will be described in details below.

PC 400 is used by a user and executes an application program to execute a variety of processes. The variety of processes include a login process for identifying a user to use and a print process of generating and transmitting a print job to print server 300. In the present embodiment, when executing a print process, PC 400 transmits a print job including user identification information for identifying a user who uses PC 400, image data, and a print condition to print server 300. Print server 300 receives a print job from PC 400 and stores the received print job into a hard disk drive (HDD). PC 400 may include the respective user identification information of one or more users (users at the destination) designated by the user who uses PC 400 in a print job, rather than the user identification information of the user who uses PC 400. Here, the user who give an instruction for printing is called an instructing user, and one or more users designated by the user who gives an instruction for printing is called accessible users. The user identification information included in a print job includes information for distinguishing between the instructing user and the accessible user.

Authentication server 500 executes a process of authenticating users who use MFPs 100A, 100B, 100C. Authentication server 500 stores user data including authentication information allocated for each user in advance. When receiving authentication information from any one of MFPs 100A, 100B, 100C, authentication server 500 compares the authentication information with the user data stored in advance, and if they agree, returns an authentication result indicating authentication success, but if they do not agree, returns an authentication result indicating that authentication failure. Here, the authentication information includes a set of user identification information for identifying a user and a password.

Portable information devices 200A, 200B, 200C each store unique device identification information allocated thereto and user identification information of the user registered in advance as a user who uses the device, in a memory. For example, when the user who gives a print instruction to PC 400 approaches MFP 100A carrying portable information device 200A, wireless communication between portable information device 200A and MFP 100A is enabled, so that MFP 100A receives the device identification information from portable information device 200A.

When becoming able to communicate with portable information device 200A, MFP 100A receives the device identification information from portable information device 200A and specifies the user carrying portable information device 200A. MFP 100A transmits a download request including the user identification information for identifying the specified user to print server 300. MFP 100A displays a login screen on the operation panel. If the user inputs authentication information to the operation panel, MFP 100A accepts the authentication information and transmits the authentication information to authentication server 500 to request authentication from authentication server 500. If the authentication result indicating authentication success is received from authentication server 500, MFP 100A transmits a download request including the user identification information included in the authentication information to print server 300.

Print server 300 receives the download request from MFP 100A and then transmits a print job to MFP 100A that has transmitted the download request. MFP 100A executes the print job received from print server 300 and forms an image of image data included in the print job on paper in accordance with the print condition.

Figure 2:
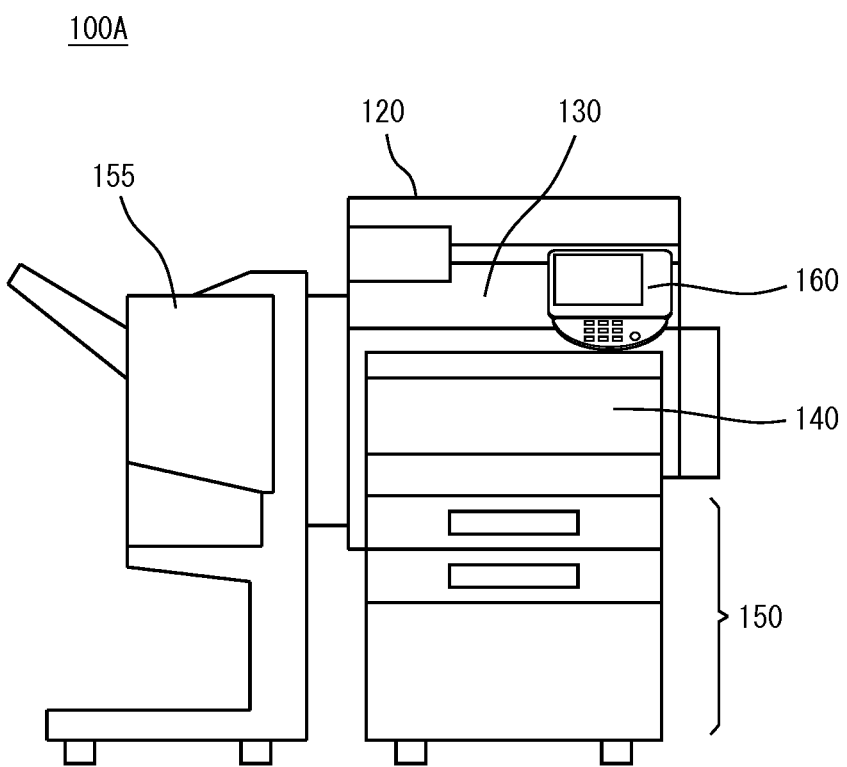
FIG. 2 is an external perspective view of an MFP.
Figure 3:
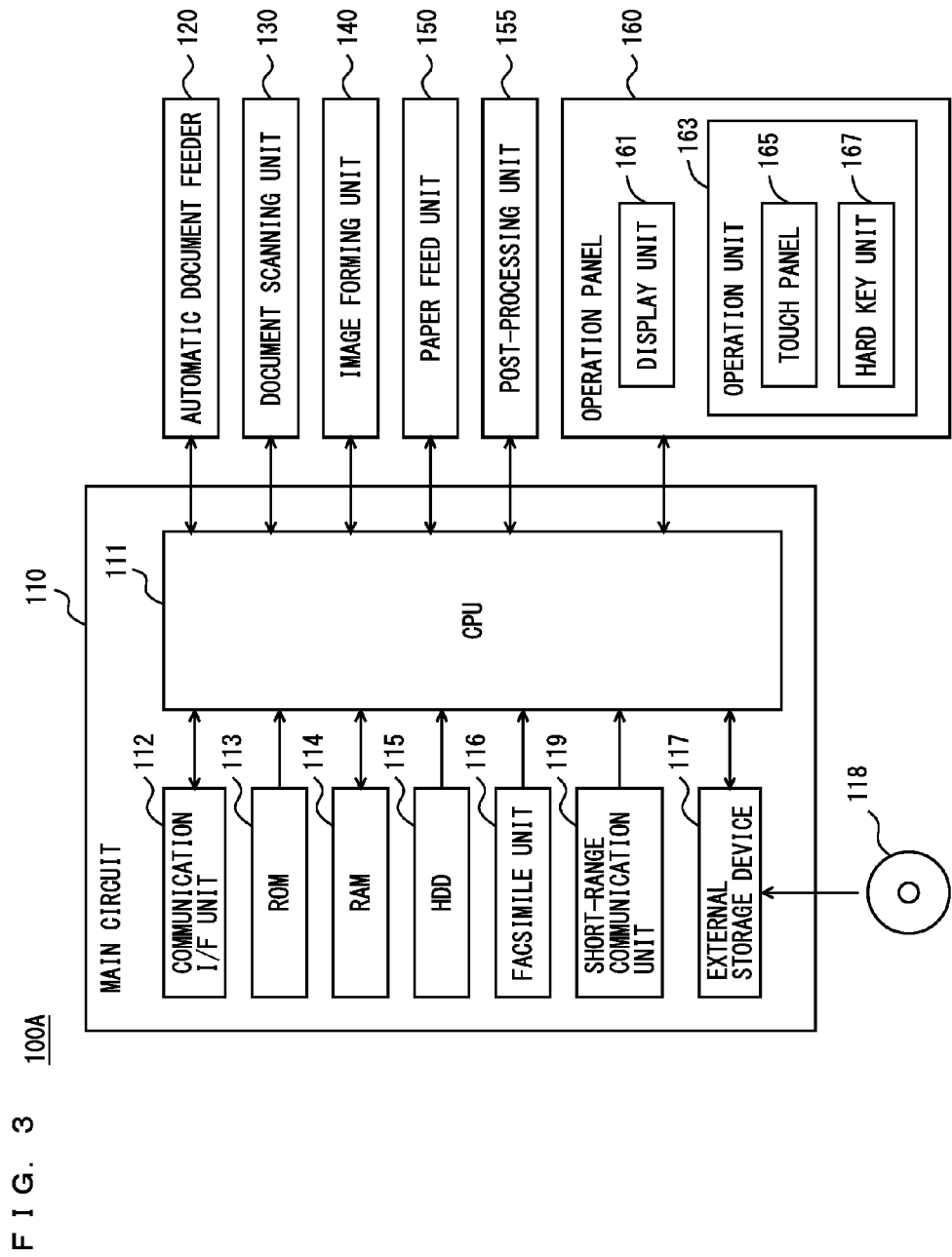
FIG. 3 is a block diagram showing the overall hardware configuration of the MFP.

FIG. 2 is an external perspective view of an MFP. FIG. 3 is a block diagram showing the overall hardware configuration of the MFP. Referring to FIG. 2 and FIG. 3, MFP 100A includes a main circuit 110, a document scanning unit 130 for scanning a document, an automatic document feeder 120 for conveying a document to document scanning unit 130, an image forming unit 140 for forming an image on paper or other medium based on image data output by document scanning unit 130 scanning a document, a paper feed unit 150 for supplying paper to image forming unit 140, a post-processing unit 155 for processing paper having an image formed thereon, and an operation panel 160 serving as a user interface.

Post-processing unit 155 executes a sorting process of sorting one or more sheets of paper having an image formed by image forming unit 140 and discharging the sorted paper, a punching process of punching holes, and a stapling process of driving a staple.

Main circuit 110 includes a CPU 111, a communication interface (I/F) unit 112, a ROM 113, a RAM 114, a hard disk drive (HDD) 115 as a mass storage device, a facsimile unit 116, an external storage device 117 to which a CD-ROM 118 is attached, and a short-range wireless communication unit 119. CPU 111 is connected to automatic document feeder 120, document scanning unit 130, image forming unit 140, paper feed unit 150, post-processing unit 155, and operation panel 160 to control the entire MFP 100.

ROM 113 stores a program executed by CPU 111 or data necessary for executing the program. RAM 114 is used as a work area when CPU 111 executes a program. RAM 114 includes a setting value storage area and a setting screen storage area. The setting value storage area is an area for storing a setting value for executing a process. The setting screen storage area is an area for storing a setting screen to be displayed on display unit 161. RAM 114 temporarily stores read data (image data) successively sent from document scanning unit 130.

Operation panel 160 is provided on the top face of MFP 100 and includes a display unit 161 and an operation unit 163. Display unit 161 is a display device such as a liquid crystal display (LCD) or an organic ELD (Electro-Luminescence Display) and displays, for example, instruction menus to users and information about the acquired image data. Operation unit 163 includes a hard key unit 167 including a plurality of keys and accepts input of various instructions and data such as characters and numerals through the user's operation corresponding to the keys. Operation unit 163 further includes a touch panel 165 provided on display unit 161.

Communication I/F unit 112 is an interface for connecting MFP 100 to network 3. CPU 111 communicates with PC 400 or portable information devices 200A, 200B, 200C through communication I/F unit 112 to transmit/receive data. Communication I/F unit 112 can also communicate with a computer connected to the Internet through network 3.

Facsimile unit 116 is connected to the Public Switched Telephone Network (PSTN) to transmit facsimile data to the PSTN or receive facsimile data from the PSTN. Facsimile unit 116 stores the received facsimile data into HDD 115 or outputs it to image forming unit 140. Image forming unit 140 prints the facsimile data received from facsimile unit 116 on paper. Facsimile unit 116 also converts data stored in HDD 115 into facsimile data and transmits the converted facsimile data to a facsimile machine connected to the PSTN.

Short-range wireless communication unit 119 wirelessly communicates with one of portable information devices 200A, 200B, 200C that falls within a range of a predetermined distance from MFP 100A, for example, based on GAP (Generic Access Profile) of the Bluetooth (registered trademark) standards. The predetermined distance is a few centimeters to ten and a few centimeters, though not limited thereto.

A CD-ROM (Compact Disc ROM) 118 is attached to external storage device 117. CPU 111 can access CD-ROM 118 through external storage device 117. CPU 111 loads the program recorded on CD-ROM 118 attached to external storage device 117 into RAM 114 for execution. The program executed by CPU 111 can be stored not only in CD-ROM 118 but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 118. A program stored in HDD 115 may be loaded into RAM 114 for execution. In this case, another computer connected to network 3 may overwrite the program stored in HDD 115 of MFP 100 or additionally write a new program. MFP 100 may download a program from another computer connected to network 3 and store the program into HDD 115. The program herein referred to includes not only a program directly executable by CPU 111 but also a source program, a compressed program, and an encrypted program.

Figure 4:
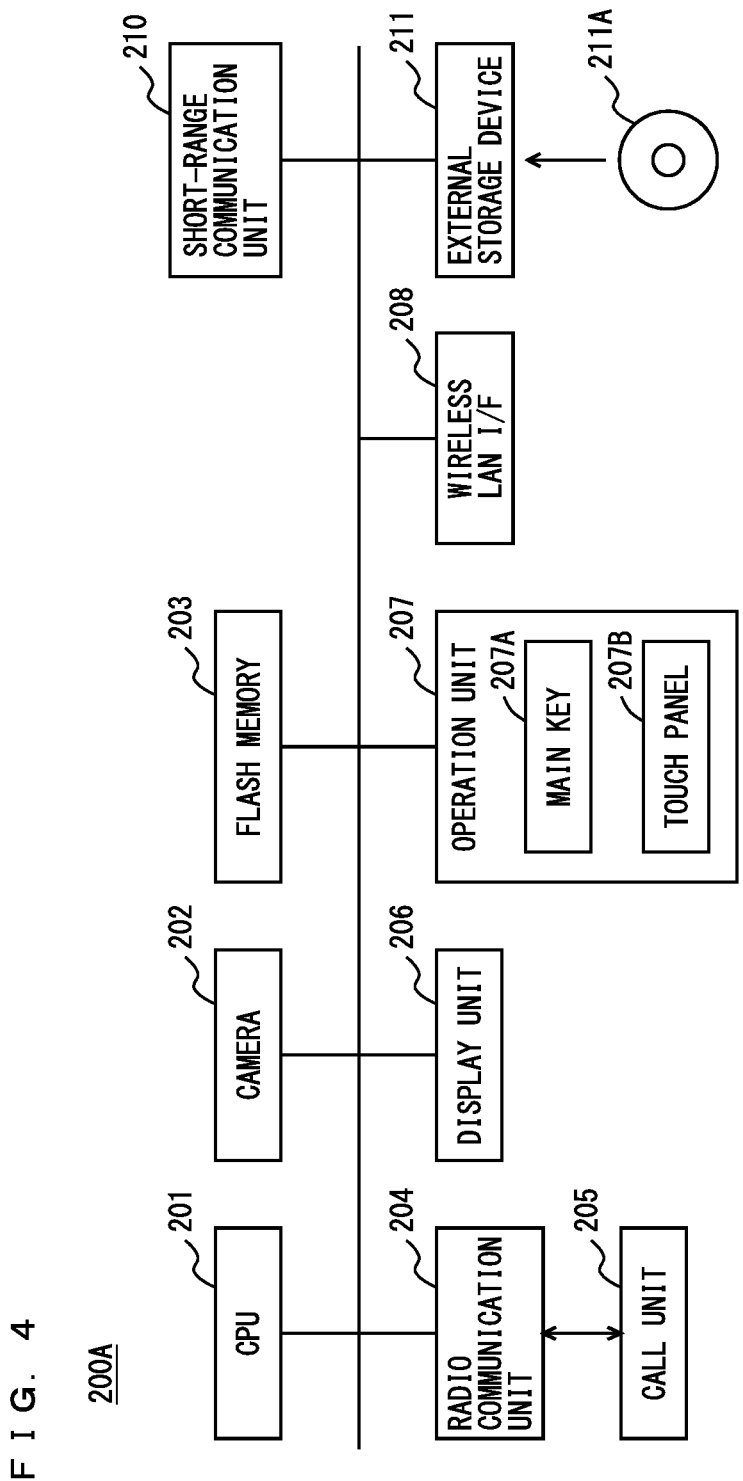
FIG. 4 is a block diagram showing the overall hardware configuration of a portable information device.

FIG. 4 is a block diagram showing the overall hardware configuration of the portable information device. Referring to FIG. 4, portable information device 200A in the present embodiment includes a CPU 201 for centrally controlling portable information device 200A, a camera 202, a flash memory 203 for storing data in a nonvolatile manner, a radio communication unit 204 connected to a call unit 205, a display unit 206 displaying information, an operation unit 207 accepting a user's operation, a wireless LAN I/F 208, a short-range wireless communication unit 210, and an external storage device 211.

Display unit 206 is a display device such as a liquid crystal display (LCD) or an organic ELD and displays, for example, instruction menus to the user and information about the acquired image data. Operation unit 207 includes a main key 207A and a touch panel 207B. When the user points to the display surface of display unit 206, operation unit 207 outputs the position of the display surface detected by touch panel 207B to CPU 201. CPU 201 detects the position designated by the user on the screen appearing on display unit 206, based on the position detected by touch panel 207B. CPU 201 accepts input of various instructions and data such as characters and numerals through the user's operation, based on the screen appearing on display unit 206 and the position detected by touch panel 207B. For example, when a screen including a ten-key image appears on display unit 206, the numeral corresponding to the key at the position detected by touch panel 207B is accepted.

Camera 202 includes a lens and an optoelectronic transducer. Light collected by the lens is imaged on the optoelectronic transducer. The optoelectronic transducer transduces the received light and outputs image data to CPU 201. The optoelectronic transducer is, for example, a CMOS (Complementary Metal Oxide Semiconductor) sensor or a CCD (Charge Coupled Device) sensor. Camera 202 has an imaging range arranged to include the user who views display unit 206. Specifically, camera 202 is arranged such that its optical axis is approximately parallel to the normal to the display surface of display unit 206 and the imaging direction is identical with the direction of the display surface. In other words, when the user views display unit 202, camera 202 includes the face of the user in the imaging range.

Radio communication unit 204 communicates by radio with a mobile phone base station connected to a telephone communication network. Radio communication unit 204 connects portable information device 200A to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201 and connects portable information device 200A to an email server to transmit/receive emails.

Wireless LAN I/F 208 is an interface that communicates with radio station 5 to connect portable information device 200A to network 3. The respective IP (Internet Protocol) addresses of PC 400 and MFPs 100A, 100B, 100C are registered in portable information device 200A so that portable information device 200A can communicate with PC 400 and MFPs 100A, 100B, 100C to transmit/receive data.

Flash memory 203 stores a program executed by CPU 201 and data necessary for executing the program. CPU 201 loads the program stored in flash memory 203 into the RAM of CPU 201 for execution. Flash memory 203 also stores device identification information for identifying portable information device 200A and user identification information for identifying the user allocated as a user who uses portable information device 200A.

Short-range wireless communication unit 210 wirelessly communicates with one of MFPs 100A, 100B, 100C that falls within a range of a predetermined distance from portable information device 200A, for example, based on GAP of the Bluetooth (registered trademark) standards.

External storage device 211 is removably attached to portable information device 200A. A CD-ROM 210A storing a program can be attached to external storage device 211. CPU 201 can access CD-ROM 210A through external storage device 211. CPU 201 can load a program recorded on CD-ROM 210A attached to external storage device 211 into the RAM of CPU 201 for execution.

The program recorded on flash memory 203 or CD-ROM 210A has been described as a program executed by CPU 201. However, another computer connected to network 3 may overwrite the program stored in flash memory 203 or additionally write a new program. Portable information device 200A may download a program from another computer connected to network 3. The program herein referred to includes not only a program directly executable by CPU 201 but also a source program, a compressed program, and an encrypted program.

The program executed by CPU 201 may be stored not only in CD-ROM 211A but also in other medium such as an optical disk (MO/MD/DVD), an IC card, an optical card, and a semiconductor memory such as a mask ROM, an EPROM, and an EEPROM.

Figure 5:
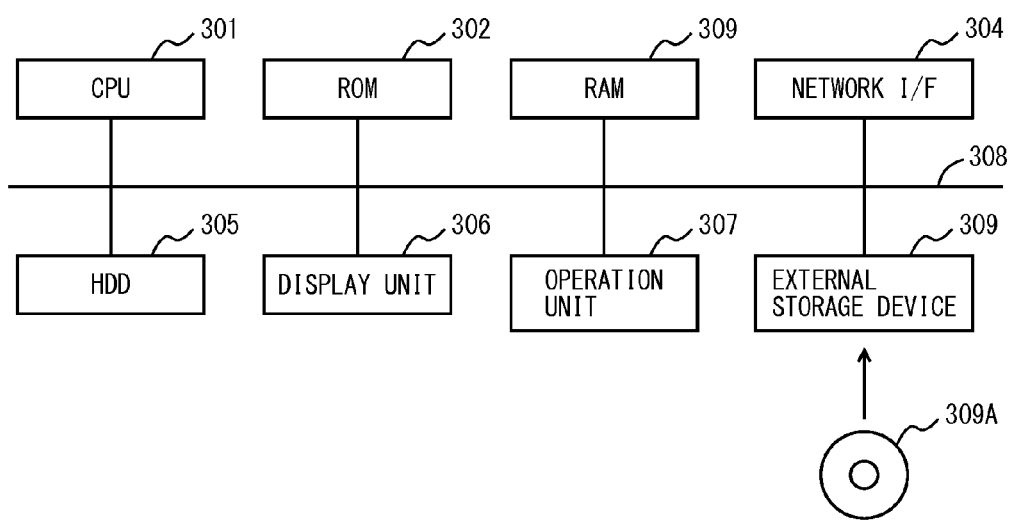
FIG. 5 is a block diagram showing an example of the hardware configuration of a print server.

FIG. 5 is a block diagram showing an example of the hardware configuration of the print server. Referring to FIG. 5, print server 300 includes a CPU 301 for centrally controlling print server 300, a ROM 302 for storing a program executed by CPU 301 and other data, a RAM 303 used as a working area for CPU 301, a network I/F 304 for connecting print server 300 to a network, an HDD 305 as a mass storage device, a display unit 306, an operation unit 307 for accepting user's operation, and an external storage device 309, each connected to a bus 308.

A CD-ROM (Compact Disc-ROM) 309A storing a print control program is attached to external storage device 309. CPU 301 loads a print control program stored in CD-ROM 309A into RAM 303 through external storage device 309 for execution. The print control program can be stored not only in CD-ROM 309A but also in other recording media such as an optical disk (MO/MD/DVD), an IC card, an optical card, and a semiconductor memory such as a mask ROM, an EPROM, and an EEPROM. The print control program stored in HDD 305 may be loaded into RAM 303 for execution. In this case, print server 300 may download the print control program from another computer connected to network 3 and store the print control program into HDD 305. The program herein referred to includes not only a program directly executable by CPU 301 but also a source program, a compressed program, and an encrypted program.

Figure 6:
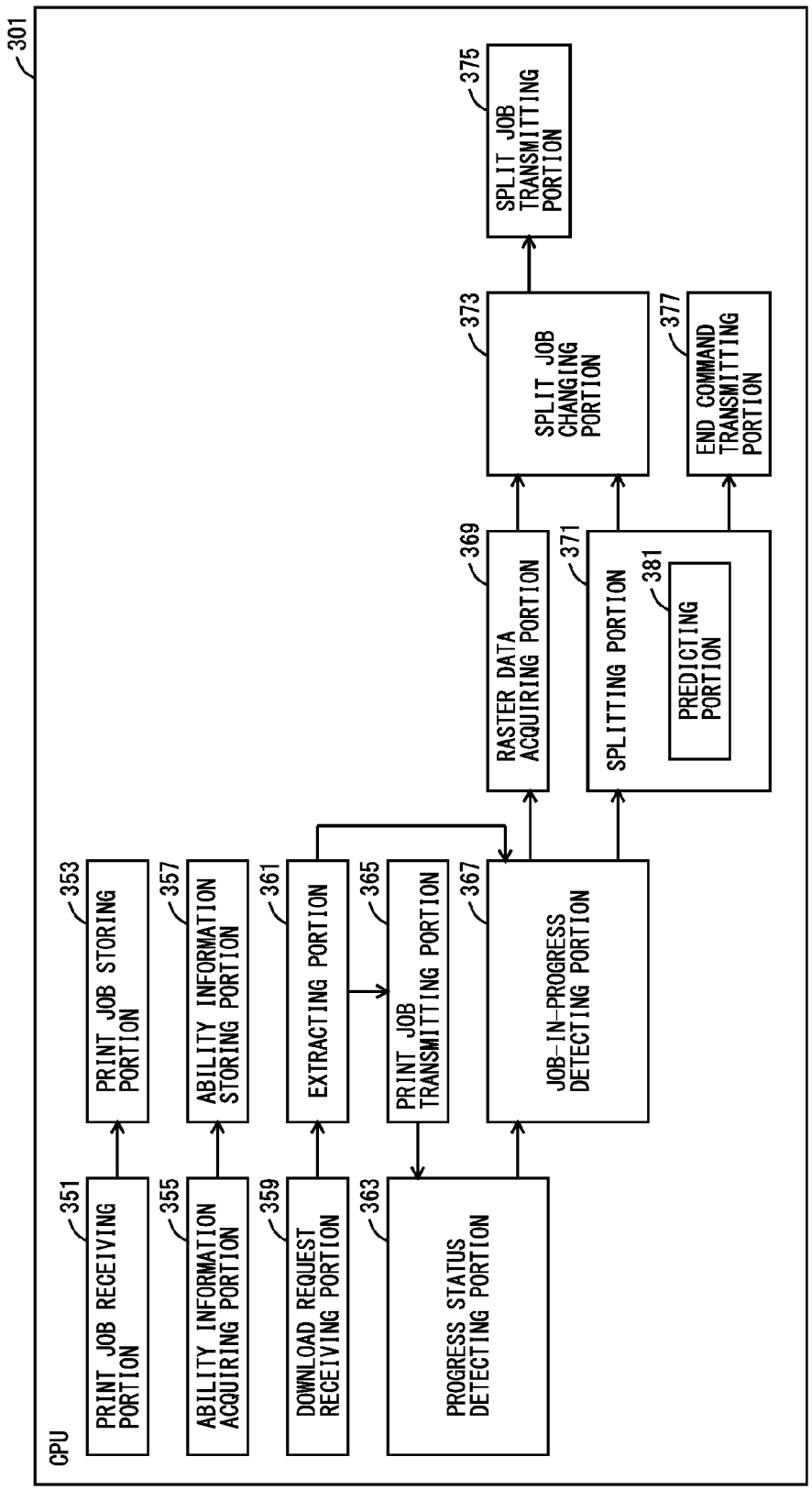
FIG. 6 is a functional block diagram showing an example of the functions of the CPU of the print server in a first embodiment.

FIG. 6 is a functional block diagram showing an example of the functions of the CPU of the print server in a first embodiment. The functions shown in FIG. 6 are formed in CPU 301 by CPU 301 of print server 300 executing the print control program stored in ROM 302, HDD 305, or CD-ROM 309A. Referring to FIG. 6, CPU 301 includes a print job receiving portion 351 to receive a print job, a print job storing portion 353 to store the received print job into HDD 305, an ability information acquiring portion 355 to acquire ability information, an ability information storing portion 357 to store the acquired ability information into HDD 305, a download request receiving portion 359 to receive a download request, an extracting portion 361 to extract a print job, a print job transmitting portion 365, a progress status detecting portion 363 to detect a progress status of the transmitted print job, a job-in-progress detecting portion 367, a raster data acquiring portion 369, a splitting portion 371, a split job changing portion 373, a split job transmitting portion 375, and an end command transmitting portion 377.

Print job receiving portion 351 controls network I/F 304 to receive a print job. When network I/F 304 receives a print job from PC 400, print job receiving portion 351 outputs the received print job to print job storing portion 353. The print job includes user identification information, image data to be printed, and a print condition indicating settings for printing. The user identification information included in a print job may include the respective user identification information of one or more accessible users in addition to the user identification information of the instructing user who gives an instruction for printing. The print condition includes the number of sheets to be printed and is written, for example, in PJL (Printer Job Language) or PDL (Page Description Language).

Print job storing portion 353 stores the print job input from print job receiving portion 351 into HDD 305. Print job storing portion 353 stores a print job into HDD 305 every time a print job is input from print job receiving portion 351. Therefore, a plurality of print jobs may be stored in HDD 305.

Ability information acquiring portion 355 acquires the ability information of each of MFPs 100A, 100B, 100C. The ability information defines the number of sheets printable by each of MFPs 100A, 100B, 100C in a predetermined time. The ability information may define a speed of receiving print data. Ability information acquiring portion 355, for example, controls network I/F 304 to receive MIB (Management Information Base) from each of MFPs 100A, 100B, 100C and acquire the ability information of each of MFPs 100A, 100B, 100C. If the administrator of print server 300 inputs the ability information of each of MFPs 100A, 100B, 100C to operation unit 307, the input ability information is acquired. Ability information acquiring portion 355 outputs the ability information of each of MFPs 100A, 100B, 100C to ability information storing portion 357. Ability information storing portion 357 stores the ability information of each of MFPs 100A, 100B, 100C input from ability information acquiring portion 355 into HDD 305. MFPs 100A, 100B, 100C each have its own ability information and the respective ability information of MFPs 100A, 100B, 100C is associated with the respective device identification information of MFPs 100A, 100B, 100C.

Download request receiving portion 359 controls network I/F 304 to receive a download request. When network I/F 304 receives a download request from any one of MFPs 100A, 100B, 100C, the download request is acquired. When a download request is received, download request receiving portion 359 specifies the device that has transmitted the download request from among MFPs 100A, 100B, 100C. The download request includes user identification information of the user who operates the one of MFPs 100A, 100B, 100C that has transmitted it. For example, if user A operates MFP 100A, the download request includes the user identification information of user A. When receiving a download request from MFP 100A, download request receiving portion 359 outputs the user identification information included in the download request and the device identification information for identifying the device that has transmitted the download request to extracting portion 361. The device identification information is the address on network 3 allocated to the device. Here, an IP (Internet Protocol) address is used. A MAC (Media Access Control) address, a domain name, or a host name may be used.

In response to input of user identification information and device identification information from download request receiving portion 359, extracting portion 361 extracts a print job that includes user identification information identical with the input user identification information from among print jobs stored in HDD 305 and outputs a set of the job identification information of the extracted job and the device identification information to print job transmitting portion 365 or job-in-progress detecting portion 367. Which of print job transmitting portion 365 and job-in-progress detecting portion 367 extracting portion 361 outputs the set will be detailed later.

Print job transmitting portion 365 receives a set of job identification information and device identification information from extracting portion 361. Print job transmitting portion 365 transmits a print job stored in HDD 305 and specified by the job identification information input from extracting portion 361 to the device specified by the device identification information. When transmitting a print job, print job transmitting portion 365 stores the device identification information of the device to which the print job is transmitted, into HDD 305 in association with the print job. Among print jobs stored in HDD 305, a print job associated with device identification information indicates that the print job is transmitted to and executed by the device that is specified by that device identification information among MFPs 100A, 100B, 100C. When transmitting a print job, print job transmitting portion 365 outputs a set of the job identification information for identifying the print job and the device identification information of the device to which the print job is transmitted among MFPs 100A, 100B, 100C, to progress status detecting portion 363. The device to which a print job is transmitted is hereinafter called the running device.

In response to input of user identification information and device identification information from download request receiving portion 359, extracting portion 361 extracts a print job that includes user identification information identical with the input user identification information from among print jobs stored in HDD 305. The extracted print job may be the one associated with device identification information or may be the one not associated with device identification information. If the extracted print job is not associated with device identification information, in other words, the print job has not been executed in any of MFPs 100A, 100B, 100C, extracting portion 361 outputs a set of the print job and the device identification information input from download request receiving portion 359 to print job transmitting portion 365.

If the extracted print job is associated with device identification information, in other words, if the print job has been executed by the running device specified by the device identification information associated therewith, extracting portion 361 outputs a set of the print job and the device identification information input from download request receiving portion 359 to job-in-progress detecting portion 367. When extracting portion 361 outputs a print job to job-in-progress detecting portion 367, the device specified by the device identification information input from download request receiving portion 359 is hereinafter called a parallel running device.

Progress status detecting portion 363 receives a set of the job identification information and the device identification information of the running device from print job transmitting portion 365. Progress status detecting portion 363 communicates with the running device specified by the device identification information from among MFPs 100A, 100B, 100C and acquires the progress status of the print job specified by the job identification information from the running device. The progress status indicates the degree of how much the print job has been executed, and includes the number of sheets of paper scheduled to be printed in the print job and the number of sheets already printed. For example, when a print job defines a process of printing images of 100 pages, if printing has been completed up to 50 pages, the progress status includes 100 sheets scheduled and 50 sheets completed. When a print job defines a process of repeatedly printing an image of one page 100 times, if printing has been completed 50 times, the progress status includes 100 sheets scheduled and 50 sheets completed. Progress status detecting portion 363 outputs a set of the job identification information, the device identification information of the running device, and the progress status to job-in-progress detecting portion 367. Progress status detecting portion 363 acquires a progress status at predetermined time intervals. The running device may transmit a progress status to print server 300 every time one sheet has been printed. If the progress status indicates that the scheduled number of sheets and the completed number of sheets are the same value, progress status detecting portion 363 deletes the print job specified by the job identification information from HDD 305.

Job-in-progress detecting portion 367 receives a set of the job identification information and the device identification information of the parallel running device from extracting portion 361 and receives a set of the job identification information, the device identification information of the running device, and the progress status from progress status detecting portion 363. In response to input of a set of the job identification information and the device identification information of the parallel running device from extracting portion 361, job-in-progress detecting portion 367 extracts, as a candidate job, a print job that is specified by the job identification information input from extracting portion 361 and is associated with the device identification information of the running device, from among print jobs stored in HDD 305. Job-in-progress detecting portion 367 detects, as a job in progress, a candidate job in which the device identification information of the running device associated therewith is different from the device identification information of the parallel running device input from extracting portion 361, from among the extracted candidate jobs. Therefore, if the parallel running device is different from the running device that executes a candidate job, job-in-progress detecting portion 367 detects the candidate job as a job-in-progress. Job-in-progress detecting portion 367 does not detect a print job that has finished being executed as a job-in-progress when progress status detecting portion 363 indicates that the progress status indicates that the scheduled number of sheets and the completed number of sheets are the same value, because the print job that has finished being executed is deleted from HDD 305.

Job-in-progress detecting portion 367 specifies the progress status corresponding to the detected job in progress from a set of the job identification information, device identification information, and progress status input from progress status detecting portion 363. The progress status is acquired by specifying a set that includes the same job identification information as the job identification information of the job in progress from among the sets of job identification information, device identification information, and progress status input from progress status detecting portion 363.

Job-in-progress detecting portion 367 outputs a set of the job identification information for identifying the job in progress, the progress status, the device identification information of the running device associated with the job in progress, and the device identification information of the parallel running device input from extracting portion 361 to splitting portion 371 and outputs a set of the job identification information for identifying the job in progress and the device identification information of the running device associated with the job in progress to raster data acquiring portion 369.

For example, if user A logs into MFP 100A in a state in which print server 300 stores print job A including the user identification information of user A, MFP 100A transmits a download request including the user identification information of user A to print server 300. In this case, extracting portion 361 extracts print job A including the user identification information of user A, and print job transmitting portion 365 transmits print job A to MFP 100A and stores print job A into HDD 305 in association with MFP 100A. MFP 100A receiving print job A executes print job A and transmits the progress status to print server 300 every time one sheet is printed. At this stage, MFP 100A is the running device that executes print job A.

If user A logs into MFP 100B while MFP 100A is in the process of executing print job A, MFP 100B transmits a download request including the user identification information of user A to print server 300. In this case, since print job transmitting portion 365 has transmitted print job A to MFP 100A, job-in-progress detecting portion 367 extracts print job A associated with MFP 100A as a candidate job from among print jobs stored in HDD 305. Since print job A extracted as a candidate job is associated with MFP 100A, which is different from MFP 100B that has transmitted the download request, job-in-progress detecting portion 367 detects print job A as a job in progress. At this stage, MFP 100B is the parallel running device.

In response to input of a set of the job identification information for identifying the job in progress and the device identification information of the running device from job-in-progress detecting portion 367, raster data acquiring portion 369 acquires raster data from the running device. Raster data acquiring portion 369 outputs the acquired raster data and the job identification information of the job in progress to split job changing portion 373. Specifically, raster data acquiring portion 369 transmits a raster data transmission request including the job identification information input from job-in-progress detecting portion 367 to the running device specified by the device identification information input from job-in-progress detecting portion 367. The running device, that is, MFP 100A in the example above, has converted print data included in print job A into raster data when executing print job A that is the job in progress. The running device MFP 100A transmits the converted raster data to print server 300 in response to reception of the raster data transmission request. Raster data acquiring portion 369 receives the raster data of the print job transmitted by the running device MFP 100A.

Splitting portion 371 receives a set of the job identification information for identifying the job in progress from job-in-progress detecting portion 367, the progress status, the device identification information of the running device associated with the job in progress, and the device identification information of the parallel running device input from extracting portion 361. Here, the case of the example above will be described. In the case of the example above, the job in progress is print job A, the running device is MFP 100A, and the parallel running device is MFP 100B. Splitting portion 371 splits the job in progress into a first split job that is the preceding section and a second split job that is the following section, outputs a set of the job identification information of the job in progress, the first split job, and the device identification information of the running device MFP 100A to end command transmitting portion 377, and outputs a set of the second split job and the device identification information of the parallel running device MFP 100B to split job changing portion 373.

Splitting portion 371 acquires the ability information of the running device MFP 100A stored by ability information storing portion 357 in HDD 305 and the ability information of the parallel running device MFP 100B. Splitting portion 371 specifies the unprocessed section of the job in progress based on the progress status. If the size of the unprocessed section is equal to or smaller than a predetermined threshold T1, splitting portion 371 outputs nothing to split job changing portion 373 and end command transmitting portion 377.

Splitting portion 371 includes a predicting portion 381. Predicting portion 381 predicts a first time for the running device MFP 100A to execute the unprocessed section of the first split job and a second time for the parallel running device MFP 100B to execute the second split job, based on the ability of the running device MFP 100A to form an image, the ability of the parallel running device MFP 100B to form an image, and the job in progress Splitting portion 371 sets a plurality of sets of the first split job and the second split job by splitting the unprocessed section of the job in progress at a plurality of locations and decides on a set of the first split job and the second split job in which the difference between the first time and the second time predicted for each set by predicting portion 381 is smallest.

For example, assume that the progress status includes 100 sheets scheduled and 50 sheets completed, the image forming ability of the running device MFP 100A is 20 sheets/minute, and the image forming ability of the parallel running device MFP 100B is 30 sheets/minute. In this case, the unprocessed section of the job in progress is 50 sheets, and the set with the smallest difference between the first time and the second time predicted by predicting portion 381 is a set of the first split job including 20 sheets of the unprocessed section and the second split job including 30 sheets of the unprocessed section. The first time and the second time predicted by predicting portion 381 in this case are one minute.

When splitting portion 371 splits the job in progress into a first split job and a second split job, a transmission time required to transmit the second split job to the parallel running device may be taken into consideration. In this case, the job in progress can be accurately split into a first split job and a second split job, so that print job A is finished being executed at the running device and at the parallel running device at the same time as much as possible.

Split job changing portion 373 receives raster data and the job identification information of the job in progress from raster data acquiring portion 369 and receives a set of the second split job and the device identification information of the parallel running device MFP 100B from splitting portion 371. Split job changing portion 373 replaces the print data included in the second split job with the raster data input from raster data acquiring portion 369. Split job changing portion 373 outputs a transmission instruction including the second split job including the raster data and the device identification information of the parallel running device MFP 100B to split job transmitting portion 375.

In response to input of a transmission instruction, split job transmitting portion 375 transmits the second split job included in the transmission instruction to the parallel running device MFP 100B specified by the device identification information included in the transmission instruction. MFP 100B receiving the second split job executes the second split job. In the example above, images from the 71-st sheet to the 100-th sheet of print job A as a job in progress are formed.

End command transmitting portion 377 receives the job identification information of the job in progress, the first split job, and the device identification information of the running device MFP 100A from splitting portion 371. End command transmitting portion 377 generates an end command from the job in progress specified by the job identification information and the first split job. End command transmitting portion 377 transmits the end command to the running device MFP 100A. The end command is a command including the job identification information of the job in progress to terminate the job in progress halfway. End command transmitting portion 377 specifies the last section of the first split job as the location where the job in progress is to be terminated. The running device MFP 100A receiving the end command stops execution of the job in progress specified by the job identification information included in the end command, at the location specified by the end command. The running device MFP 100A therefore will not execute the job in progress to the last, so that MFP 100A will not print a sheet with the same image as on a sheet output by the parallel running device MFP 100B executing the second split job.

The functions of MFP 100A to 100C will now be described. MFP 100A to 100C have the same functions, and the function of MFP 100A will be described by way of example, unless otherwise specified.

Figure 7:
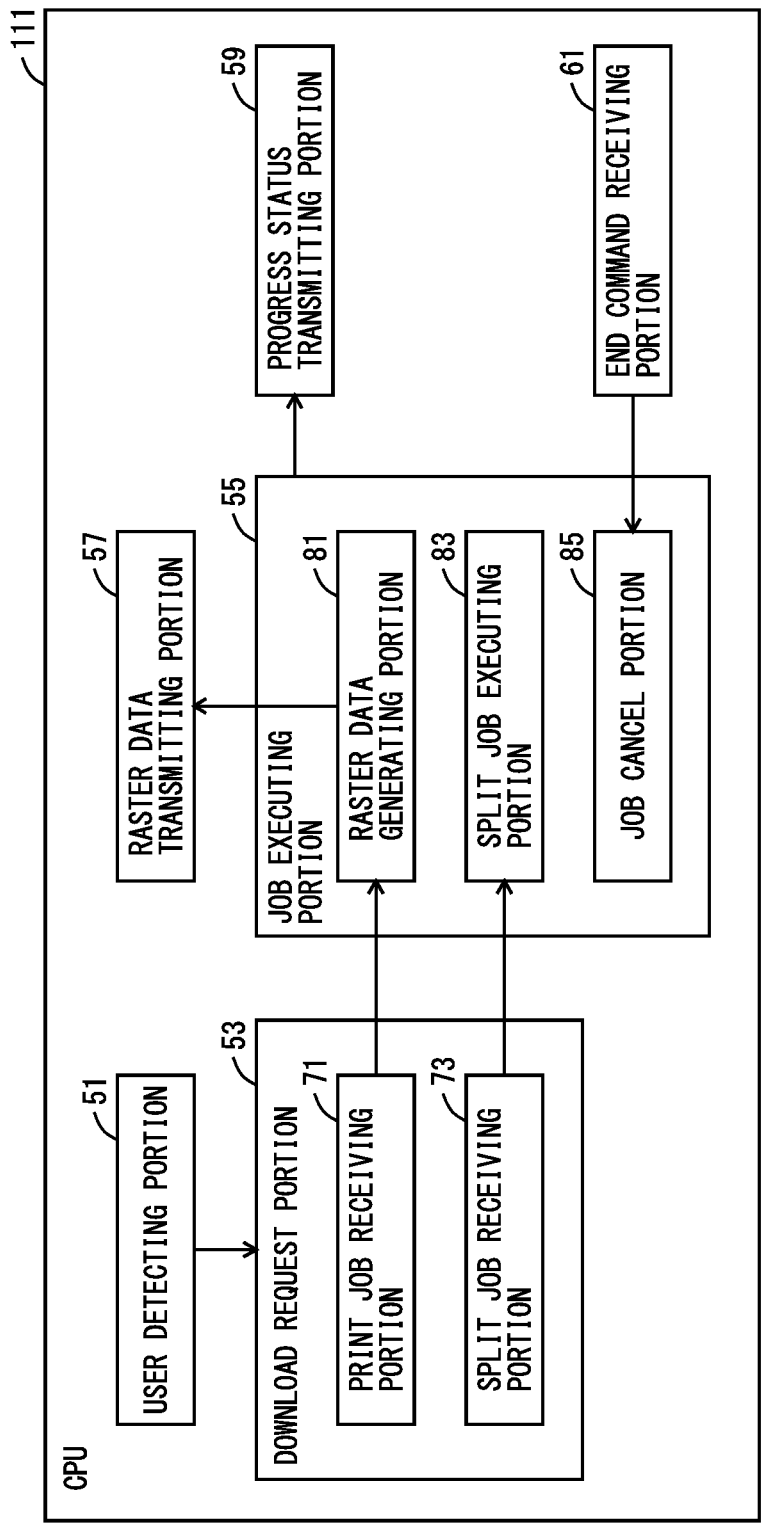
FIG. 7 is a functional block diagram showing an example of the functions of the CPU of the MFP in the first embodiment.

FIG. 7 is a functional block diagram showing an example of the functions of the CPU of the MFP in the first embodiment. The functions shown in FIG. 7 are formed in CPU 111 by CPU 111 of MFP 100A executing the print job execution program. The functions shown in FIG. 7 include the functions performed when MFP 100A to 100C each function as a running device and the functions performed when each functions as a parallel running device. Here, MFP 100A functions as a running device, and MFP 100B functions as a parallel running device, by way of example.

Referring to FIG. 7, CPU 111 of MFP 100A includes a user detecting portion 51 to detect a user, a download request portion 53, a job executing portion 55 to execute a print job, a raster data transmitting portion 57, a progress status transmitting portion 59, and an end command receiving portion 61.

<Functions of Running Device>

User detecting portion 51 detects the user who operates MFP 100A. When a user operates operation panel 160, user detecting portion 51 displays a login screen on display unit 161 and accepts authentication information input by the user to operation unit 163. User detecting portion 51 transmits the accepted authentication information to authentication server 500 through communication I/F unit 112 to allow authentication server 500 to perform authentication. Here, the authentication information includes the user ID and a password. Authentication server 500 receiving authentication information compares the authentication information with the user data stored in advance and, if they agree, returns an authentication result indicating authentication success but, if they do not agree, returns an authentication result indicating authentication failure. Here, the user data includes the user identification information for identifying the user and a password. If communication I/F unit 112 receives an authentication result indicating authentication success from authentication server 500, user detecting portion 51 outputs the user identification information to download request portion 53. If an authentication result indicating authentication failure is received, user detecting portion 51 displays an error message on display unit 114.

User detecting portion 51 allows short-range communication unit 119 to periodically output a transmission request for device identification information. When short-range communication unit 119 receives the device identification information transmitted by the one of portable information devices 200A, 200B, 200C that has received the transmission request, the device identification information is accepted from short-range communication unit 119. A user table is stored in MFP 100A in advance, in which, for each of portable information devices 200A, 200B, 200C, the user identification information of the user allocated in advance as a user who uses the device is associated with the device identification information of the device. The user table is referred to in order to detect the user who operates the device that short-range communication unit 119 becomes able to communicate with, from among portable information devices 200A, 200B, 200C. The user identification information of the user who operates portable information device 200A may be acquired from portable information device 200A. When detecting the user who operates the device that short-range communication unit 119 becomes able to communicate with, user detecting portion 51 outputs the user identification information of the user to download request portion 53.

In response to input of the user identification information from user detecting portion 51, download request portion 53 transmits a download request to print server 300 through communication I/F unit 112. The download request includes the user identification information input from user detecting portion 51.

As described above, print server 300 receives a download request from any one of MFP 100A to 100C and then transmits the print job that includes the user identification information included in the download request or the second split job formed by splitting the job in progress. Download request portion 53 includes a print job receiving portion 71. When communication I/F unit 112 receives a print job from print server 300, print job receiving portion 71 outputs the print job to job executing portion 55.

Job executing portion 55 executes the print job input from print job receiving portion 71. Job executing portion 55 includes a raster data generating portion 81 and a job cancel portion 85. Raster data generating portion 81 generates raster data from the print data included in the print job input from print job receiving portion 71. Raster data generating portion 81 outputs a set of the generated raster data and the job identification information of the print job to raster data transmitting portion 57. Job executing portion 55 forms an image of the raster data generated by raster data generating portion 81 on paper in accordance with the print condition included in the print job.

Progress status transmitting portion 59 transmits the progress status of the print job executed by job executing portion 55 to print server 300. Progress status transmitting portion 59 transmits a progress status every time job executing portion 55 forms an image on a sheet of paper. Progress status transmitting portion 59 may transmit a progress status at predetermined time intervals.

When communication I/F unit 112 receives a transmission request for raster data from server 300, raster data transmitting portion 57 transmits the raster data paired with the job identification information included in the transmission request to print server 300 through communication I/F unit 112.

End command receiving portion 61 controls communication I/F unit 112 to receive an end command transmitted from print server 300. End command receiving portion 61 outputs the end command received from the print server to job cancel portion 85.

In response to input of the end command, if the print job executed by job executing portion 55 has the job identification information included in the end command, job cancel portion 85 cancels execution of the print job when the print job is executed up to the location included in the end command.

<Functions of Parallel Running Device>

User detecting portion 51 has the same function as in the running device. In response to input of user identification information from user detecting portion 51, download request portion 53 transmits a download request to print server 300 through communication I/F unit 112. The download request includes the user identification information input from user detecting portion 51. Download request portion 53 includes a split job receiving portion 73. When communication I/F unit 112 receives a second split job from print server 300, split job receiving portion 73 outputs the second split job to job executing portion 55.

Job executing portion 55 executes the second split job input from split job receiving portion 73. Job executing portion 55 includes a split job executing portion 83. Split job executing portion 83 executes the second split job input from split job receiving portion 73. Specifically, split job executing portion 83 forms an image of raster data included in the second split job on paper in accordance with the print condition included in the second split job.

Figure 8:
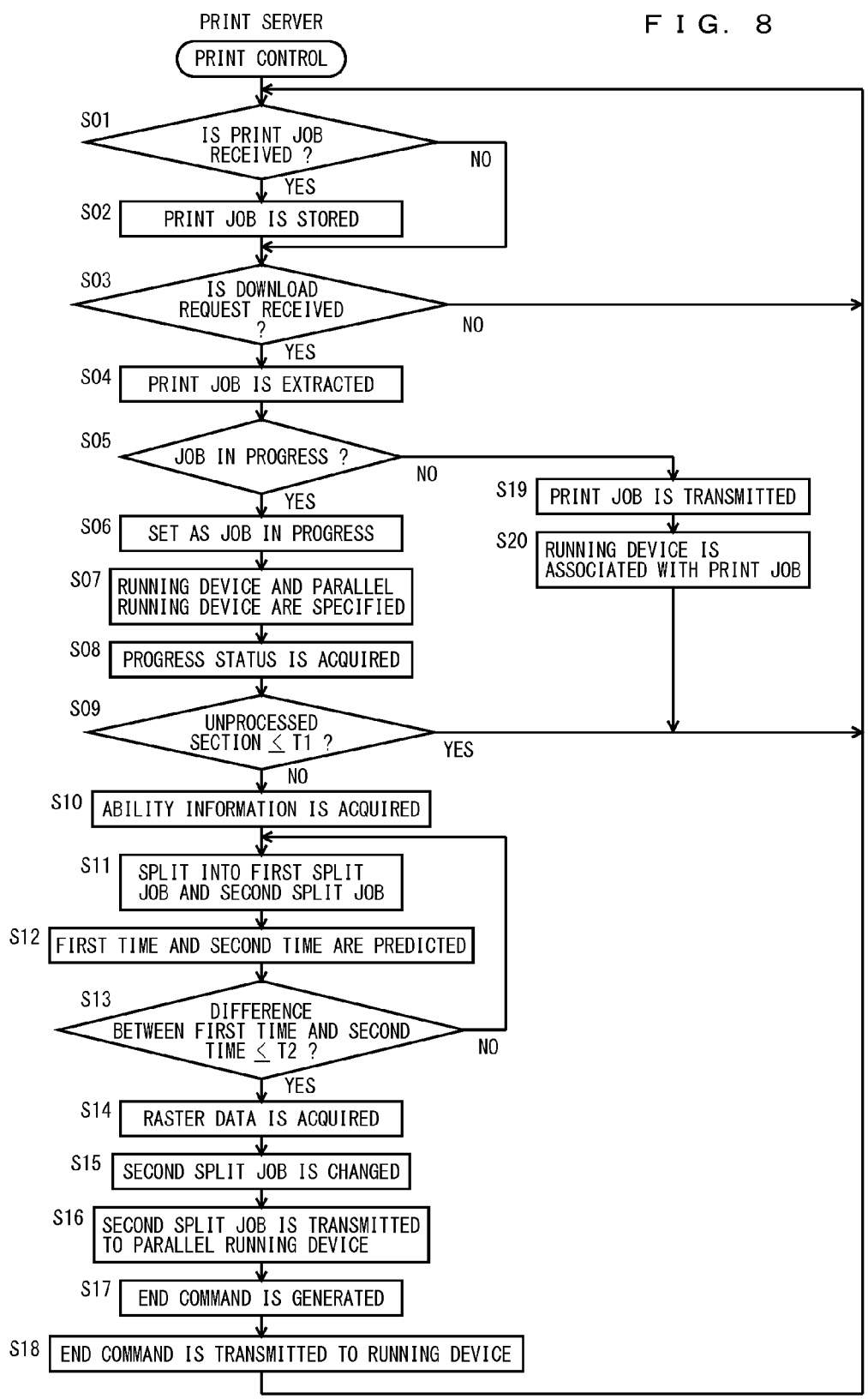
FIG. 8 is a flowchart showing an example of the procedure of a print control process in the first embodiment.

FIG. 8 is a flowchart showing an example of the procedure of a print control process in the first embodiment. The print control process is a process executed by CPU 301 by CPU 301 of print server 300 executing the print control program. Referring to FIG. 8, CPU 301 determines whether network I/F 304 receives a print job from PC 400 (step S01). If a print job is received, the process proceeds to step S02. If not, step S02 is skipped and the process proceeds to step S03. The print job includes user identification information, image data to be printed, and a print condition. The user identification information included in the print job may be either the user identification information of the instructing user or the user identification information of the accessible user, otherwise both. In step S02, the received print job is stored into HDD 305, and the process proceeds to step S03.

In the next step S03, it is determined whether network I/F 304 receives a download request from any one of MFPs 100A, 100B, 100C. If a download request is received, the process proceeds to step S04. If not, the process returns to step S01.

In step S04, a print job that includes user identification information identical with the user identification information included in the download request received in step S03 is extracted from among print jobs stored in HDD 305. In step S05, it is determined whether the extracted print job is a job in progress. If the print job is associated with device identification information, it is determined that the print job is a job in progress. If not associated with device identification information, it is determined that the print job is not a job in progress. If it is determined that the print job is a job in progress, the process proceeds to step S06. If not, the process proceeds to step S19.

In step S19, the print job extracted in step S04 is transmitted to the device that has transmitted the download request received in step S03. At this stage, the device that receives the print job is the running device, and the running device executes the received print job. In the next step S20, the running device is associated with the print job, and the process returns to step S01. The device identification information of the running device is associated with the transmitted print job among print jobs stored in HDD 305. At this stage, the transmitted print job is a job in progress.

Meanwhile, in step S06, the print job extracted in step S04 is set as a job in progress. The running device and the parallel running device are then specified (step S07). The device specified by the device identification information stored in HDD 305 in association with the job in progress is specified as a running device. The device that has transmitted the download request received in step S03 is specified as a parallel running device.

In the next step S08, the progress status of the job in progress is acquired. The progress status that includes the job identification information of the job in progress is acquired from among the progress statuses received from the running device. It is then determined from the progress status whether the unprocessed section of the job in progress is equal to or smaller than threshold T1. If the unprocessed section, which is obtained by subtracting the completed number of sheets from the scheduled number of sheets, is equal to or smaller than threshold T1, the process returns to step S01. If not, the process proceeds to step S10. This is because executing the unprocessed section in the running device may be faster than splitting the job in progress and executing the split job.

In step S10, the ability information of each of the running device and the parallel running device is acquired. The ability information is acquired from each of the running device and the parallel running device. The ability information is here the number of sheets printed in a predetermined time. The ability information may be acquired from each of MFPs 100A, 100B, 100C in advance so that the ability information of the running device and the ability information of the parallel running device are determined.

In the next step S11, the job in progress is split into a first split job and a second split job. The unprocessed section in which processing has not been executed in the job in progress is specified based on the progress status, and the unprocessed section is split into two at any given location. The location of splitting is preferably determined based on the ability information of the running device and the ability information of the parallel running device. In the next step S13, the first time and the second time are predicted. The time for the running device to execute the unprocessed section of the first split job is predicted as the first time, and the time for the parallel running device to execute the second split job is predicted as the second time. It is then determined whether the difference between the first time and the second time is equal to or smaller than threshold T2 (step S13). If the difference between the first time and the second time is equal to or smaller than threshold T2, the process proceeds to step S14. If not, the process returns to step S11. In step S11, if the process proceeds from step S13, the location where the job in progress is split is changed to a different location, and the job in progress is split into a first split job and a second split job at the different location.

In step S14, raster data is acquired from the running device, and the process proceeds to step S15. A raster data transmission request including the job identification information of the job in progress set in step S06 is transmitted to the running device, and the raster data sent from the running device is received. The running device MFP 100A has converted the print data included in print job A into raster data when executing print job A as a job in progress. In the next step S15, the second split job is changed, and the process proceeds to step S16. The print data included in the second split job is replaced by the raster data acquired in step S14.

In step S16, the second split job is transmitted to the parallel running device, and the process proceeds to step S17. In step S17, an end command is generated. An end command to terminate the job in progress after the last section of the first split job is executed is generated based on the job in progress and the first split job. The end command includes the job identification information of the job in progress and the page number of the last page. In the next step S18, the end command is transmitted to the running device, and the process returns to step S01.

Figure 9:
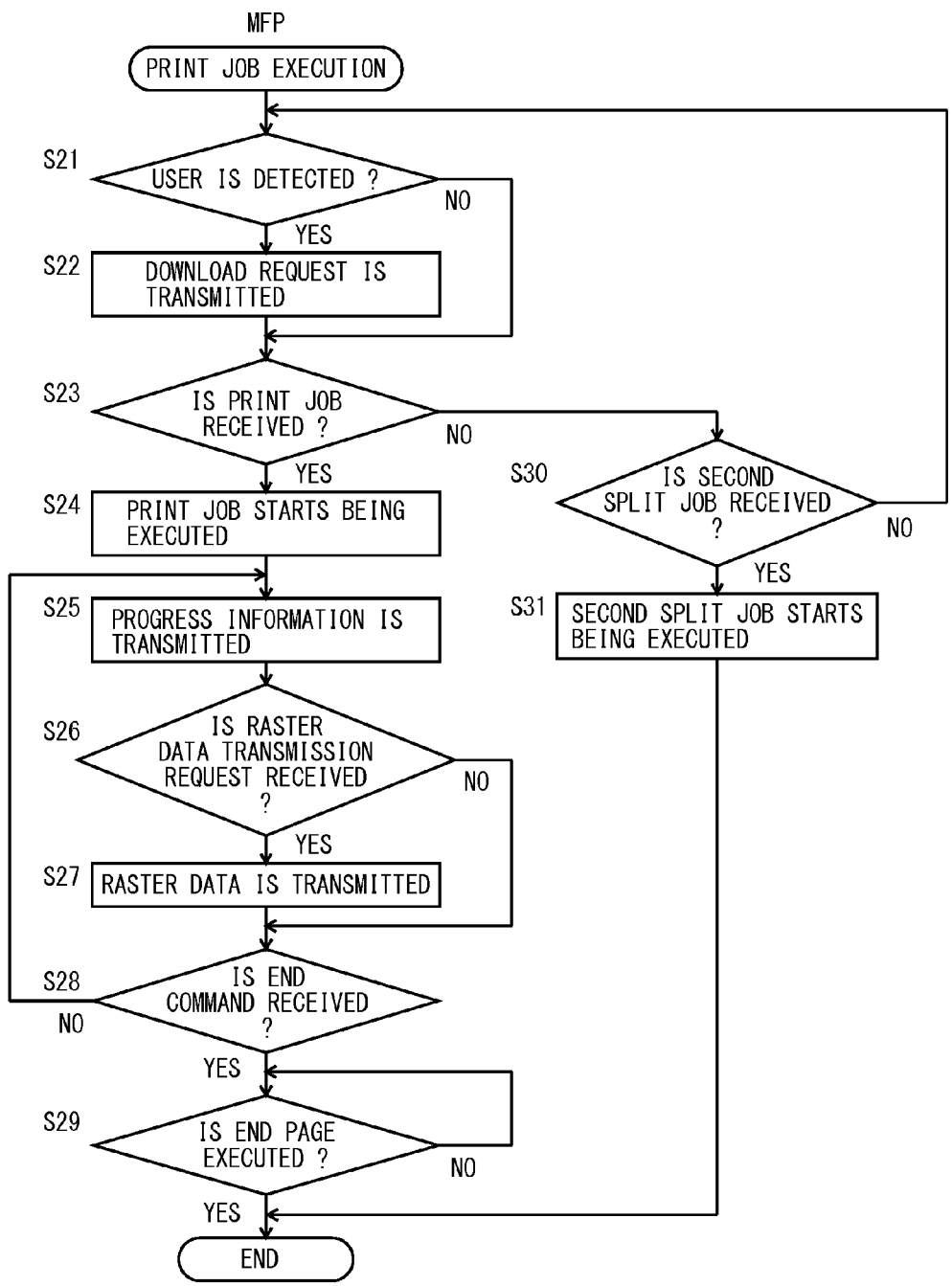
FIG. 9 is a flowchart showing an example of the procedure of a print job execution process in the first embodiment.

FIG. 9 is a flowchart showing an example of the procedure of a print job execution process in the first embodiment. The print job execution process is a process performed by CPU 111 by CPU 111 of each of MFPs 100A, 100B, 100C executing the print job execution program. Here, the print job execution process executed by CPU 111 in a case where CPU 111 of MFP 100A executes the print job execution program will be described by way of example.

Referring to FIG. 9, CPU 111 determines whether a user is detected (step S21). The process waits until a user is detected (NO in step S21). If a user is detected (YES in step S21), the process proceeds to step S22. When short-range communication unit 119 receives the device identification information from any one of portable information devices 200A, 200B, 200C, the user having the user identification information associated with the device identification information is detected. When authentication is successful based on the authentication information input by the user to operation unit 163, the user is detected.

In step S22, a download request is transmitted to print server 300. The download request includes the user identification information of the user detected in step S21. Print server 300 receiving the download request returns a print job that includes user identification information identical with the user identification information included in the download request or a second split job.

In step S23, it is determined whether communication I/F unit 112 receives a print job from print server 300. If a print job is received, the process proceeds to step S24. If not, the process proceeds to step S30. In step S30, it is determined whether communication I/F unit 112 receives a second split job from print server 300. If a second split job is received, the process proceeds to step S31. If not, the process returns to step S21. In step S31, the second split job starts being executed. The process then ends.

Meanwhile, in step S24, the print job starts being executed, and the process proceeds to step S25. When the print job is executed, raster data obtained by converting the print data included in the print job is stored into RAM 114.

In the next step S25, the progress status of the print job is transmitted to print server 300 through communication I/F unit 112, and the process proceeds to step S26. In step S26, it is determined whether communication I/F unit 112 receives a transmission request for raster data from print server 300. If a transmission request is received, the process proceeds to step S27. If not, the process proceeds to step S28. In step S27, the raster data stored in RAM 114 when the print job started in step S24 is executed is transmitted to print server 300 through communication I/F unit 112.

In step S28, it is determined whether an end command is received. If communication I/F unit 112 receives an end command from print server 300, the process proceeds to step S29. If not, the process returns to step S25. The end command includes the end page of the print job started in step S24.

In step S29, the process waits until the end page is executed. It is determined whether the print job started in step S24 is executed and the end page specified by the end command is printed. If the end page is executed, the process ends.

As described above, in response to reception of a download request from MFP 100A, the print server in the first embodiment returns a print job that includes user identification information identical with the user identification information included in the download request to MFP 100A. Thereafter, in response to reception of a download request from MFP 100B, the print server detects the print job transmitted to MFP 100A as a job in progress, if the print job transmitted to MFP 100A includes user identification information identical with the user identification information included in the download request received from MFP 100B and the progress status of the print job being executed in MFP 100A is in progress. The print server then splits the job in progress into a first split job that is the preceding section and a second split job that is the following section, based on the progress status of the job in progress, and transmits the second split job to MFP 100B. The print server generates an end command to terminate the job in progress based on the first split job and transmits the end command to MFP 100A. Therefore, part of the job in progress being executed in MFP 100A is executed by MFP 100B, so that the job in progress can be finished earlier.

Raster data obtained by expanding the print data included in the job in progress is acquired from MFP 100A. The print data included in the second split job is changed to the acquired raster data, and the changed second split job is transmitted to MFP 100B. MFP 100B therefore does not have to generate raster data, thereby reducing the load on MFP 100B.

The first time for MFP 100A to execute the first split job and the second time for MFP 100B to execute the second split job are predicted based on the image forming ability of MFP 100A and the image forming ability of MFP 100B, and the first split job and the second split job in which the difference between the first time and the second time is smallest are determined. Therefore, the print job is finished at MFP 100A and at MFP 100B at the same time as much as possible.

Second Embodiment

In print system 1 in the first embodiment, print server 300 splits the job in progress into a first split job and a second split job. In print system 1 in the second embodiment, the parallel running device splits the job in progress into a first split job and a second split job. The system configuration and the hardware configuration of each device of print system 1 in the second embodiment are the same as in the first embodiment shown in FIG. 1 to FIG. 5, and a description thereof will not be repeated here.

Figure 10:
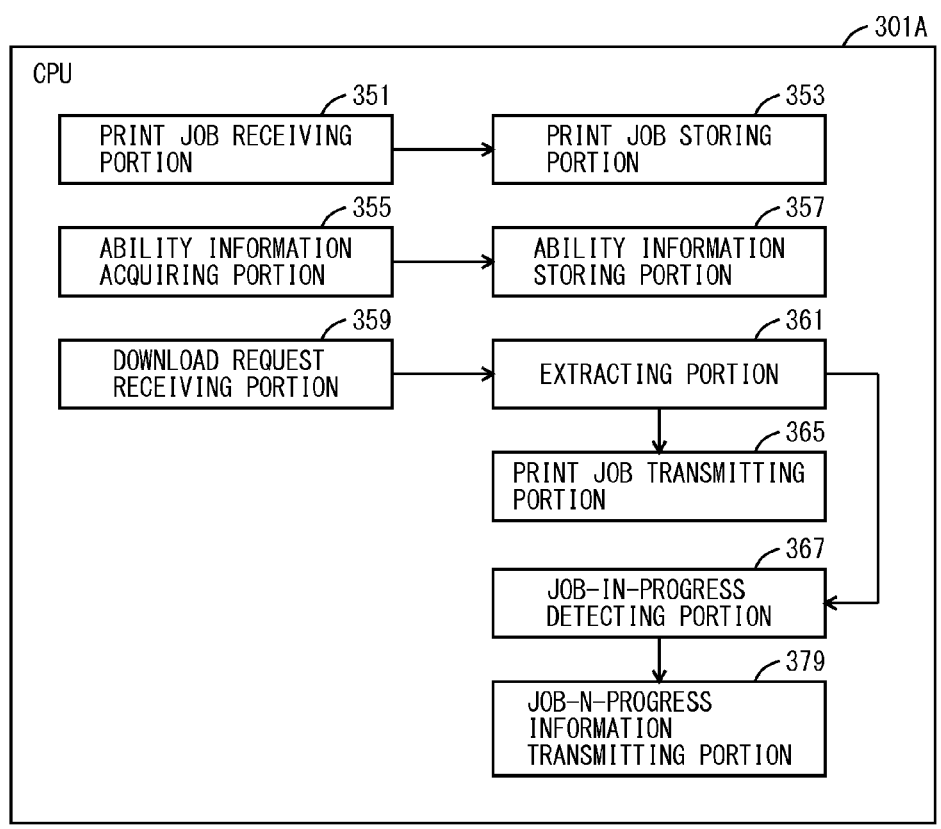
FIG. 10 is a functional block diagram showing an example of the functions of the CPU of the print server in a second embodiment.

FIG. 10 is a functional block diagram showing an example of the functions of the CPU of the print server in the second embodiment. Referring to FIG. 10, the functions differ from the functions of the CPU of the print server in the first embodiment shown in FIG. 6 in that progress status detecting portion 363, raster data acquiring portion 369, splitting portion 371, split job changing portion 373, split job transmitting portion 375, and end command transmitting portion 377 are deleted, and a job-in-progress information transmitting portion 379 is added. The other functions are the same as the functions shown in FIG. 6 and a description thereof is not repeated here.

Job-in-progress detecting portion 367 outputs a set of the job identification information of the job in progress, the device identification information of the running device, and the device identification information of the parallel running device to job-in-progress information transmitting portion 379.

Job-in-progress information transmitting portion 379 reads the job in progress specified by the job identification information input from job-in-progress detecting portion 367 from HDD 305 and transmits job-in-progress information including the job in progress and the device identification information of the running device to the parallel running device. After transmitting the job-in-progress information, job-in-progress information transmitting portion 379 deletes the job in progress from HDD 305. Therefore, after the job in progress is transmitted to the parallel running device, job-in-progress detecting portion 367 will not detect the print job of the job in progress as a job in progress next time when a download request is received.

Here, assume that the running device is MFP 100A, the parallel running device is MFP 100B, and the job in progress is print job A.

Figure 11:
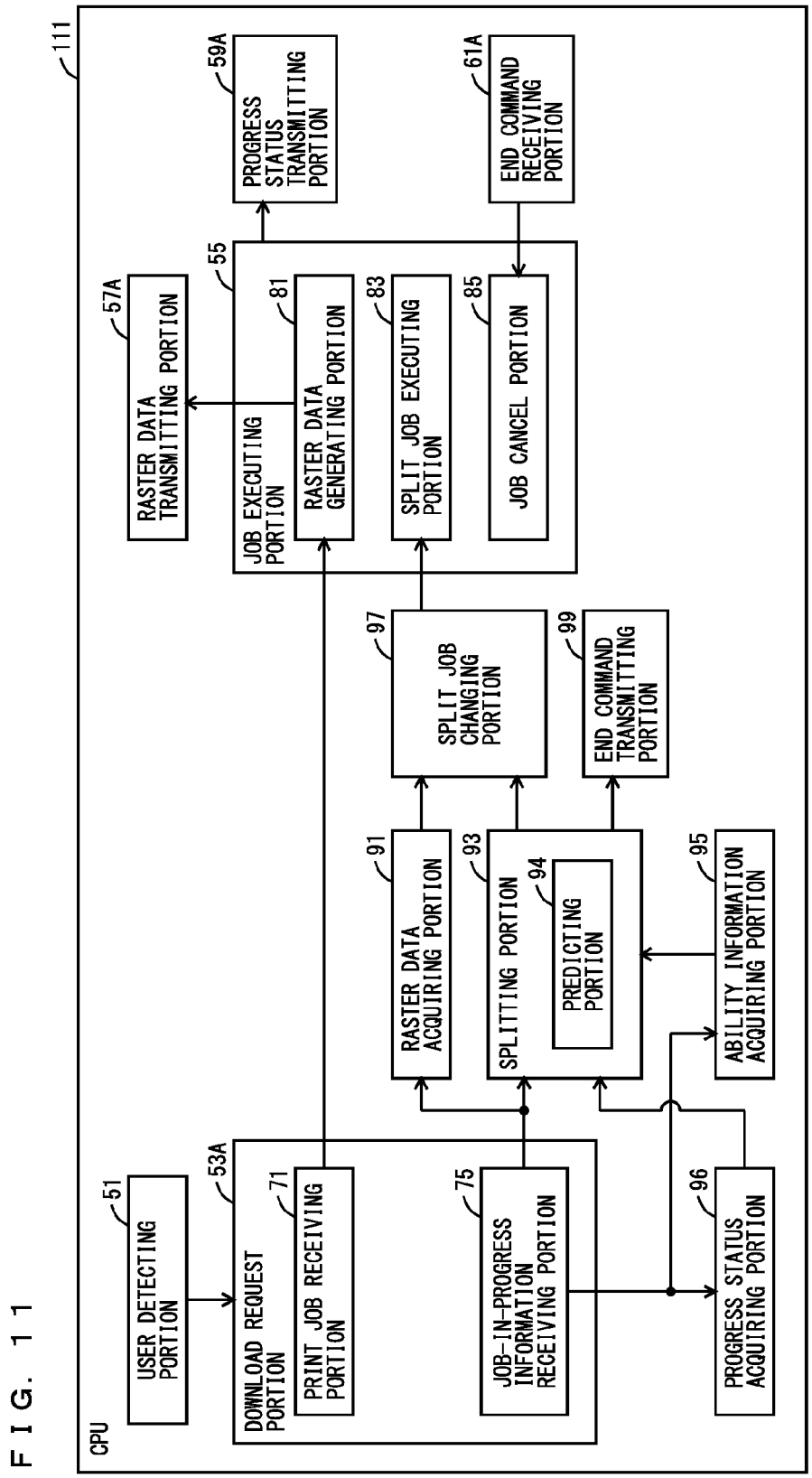
FIG. 11 is a functional block diagram showing an example of the functions of the CPU of the MFP in the second embodiment.

FIG. 11 is a functional block diagram showing an example of the functions of the CPU of the MFP in the second embodiment. Referring to FIG. 11, the functions differ from the functions of the CPU of the MFP in the first embodiment shown in FIG. 7 in that download request portion 53, raster data transmitting portion 57, progress status transmitting portion 59, and end command receiving portion 61 are changed to a download request portion 53A, a raster data transmitting portion 57A, a progress status transmitting portion 59A, and an end command receiving portion 61A, respectively, and that raster data acquiring portion 91, a splitting portion 93, an ability information acquiring portion 95, a progress status acquiring portion 96, a split job changing portion 97, and an end command transmitting portion 99 are added. The other functions are the same as the functions shown in FIG. 6, and a description thereof is not repeated here.

The functions shown in FIG. 11 include the functions performed when MFP 100A to 100C each function as a running device and the functions performed when each functions as a parallel running device. Here, MFP 100A functions as a running device, and MFP 100B functions as a parallel running device, by way of example.

<Functions of Running Device>

User detecting portion 51 is the same function as in the running device in the first embodiment. Download request portion 53A includes a print job receiving portion 71. In response to input of user identification information from user detecting portion 51, download request portion 53A transmits a download request to print server 300 through communication I/F unit 112. The download request includes the user identification information input from user detecting portion 51.

Print server 300 receives the download request from any one of MFP 100A to 100C and then transmits a print job that includes the user identification information included in the download request or job-in-progress information. When communication I/F unit 112 receives a print job from print server 300 in response to transmission of the download request, print job receiving portion 71 outputs the print job to job executing portion 55.

Job executing portion 55 executes the print job input from print job receiving portion 71. Job executing portion 55 includes a raster data generating portion 81 and a job cancel portion 85. Raster data generating portion 81 generates raster data from the print data included in the print job input from print job receiving portion 71. Raster data generating portion 81 outputs a set of the generated raster data and the job identification information of the print job to raster data transmitting portion 57A. Job executing portion 55 forms an image of the raster data generated by raster data generating portion 81 on paper in accordance with the print condition included in the print job.

Progress status transmitting portion 59A transmits the progress status of the print job executed by job executing portion 55 to the parallel running device in response to a request from the parallel running device MFP 100B.

When communication I/F unit 112 receives a transmission request for raster data from the parallel running device MFP 100B, raster data transmitting portion 57A transmits the raster data paired with the job identification information included in the transmission request to the parallel running device MFP 100B through communication I/F unit 112.

End command receiving portion 61A controls communication I/F unit 112 to receive the end command transmitted from the parallel running device MFP 100B. End command receiving portion 61A outputs the end command received from the parallel running device MFP 100B to job cancel portion 85.

In response to input of the end command, if the print job executed by job executing portion 55 has the job identification information included in the end command, job cancel portion 85 cancels execution of the print job when the print job is executed to the location included in the end command.

<Functions of Parallel Running Device>

User detecting portion 51 is the same function as in the running device. In response to input of user identification information from user detecting portion 51, download request portion 53A transmits a download request to print server 300 through communication I/F unit 112. The download request includes the user identification information input from user detecting portion 51.

Print server 300 receives the download request from MFP 100B and then transmits a print job that includes the user identification information included in the download request or job-in-progress information. Download request portion 53A includes a job-in-progress information receiving portion 75. Job-in-progress information receiving portion 75 controls communication I/F unit 112 to receive the job-in-progress information from print server 300 in response to transmission of a download request. The job-in-progress information includes the job in progress, the progress status, and the device identification information of the running device MFP 100A. Job-in-progress information receiving portion 75 outputs the job-in-progress information to raster data acquiring portion 91, splitting portion 93, progress status acquiring portion 96, and ability information acquiring portion 95.

In response to input of the job-in-progress information from job-in-progress information receiving portion 75, raster data acquiring portion 91 acquires raster data from the running device. Raster data acquiring portion 369 outputs the acquired raster data and the job identification information of the job in progress to split job changing portion 97. Raster data acquiring portion 91 transmits a raster data transmission request to the running device MFP 100A specified by the device identification information included in the job-in-progress information. The raster data transmission request includes the job identification information of the job in progress included in the job-in-progress information. The running device MFP 100A has converted the print data included in print job A into raster data when executing print job A as a job in progress. The running device MFP 100A transmits the converted raster data to the parallel running device MFP 100B in response to reception of the raster data transmission request. Raster data acquiring portion 91 receives the raster data of the print job transmitted by the running device MFP 100A.

In response to input of the job-in-progress information from job-in-progress information receiving portion 75, progress status acquiring portion 96 acquires the progress status of the job in progress from the running device MFP 100A. Progress status acquiring portion 96 transmits a transmission request including the job identification information of the job in progress included in the job-in-progress information to MFP 100A specified by the device identification information of the running device included in the job-in-progress information and receives the progress status of the job in progress sent from MFP 100A. Progress status acquiring portion 96 outputs the progress status of the job in progress to splitting portion 93.

In response to input of the job-in-progress information from job-in-progress information receiving portion 75, ability information acquiring portion 95 acquires the ability information of the running device MFP 100A. Ability information acquiring portion 95 outputs the ability information of the running device MFP 100A to splitting portion 93. The ability information defines the number of sheets printable by the running device MFP 100A in a predetermined time. Ability information acquiring portion 355 controls communication I/F unit 112 to receive MIB from the running device MFP 100A and acquire the ability information. If the administrator of each of MFPs 100A, 100B, 100C inputs the ability information of each of MFPs 100A, 100B, 100C to operation unit 307, the input ability information may be stored in advance.

Splitting portion 93 receives the job-in-progress information from job-in-progress information receiving portion 75. Splitting portion 93 splits the job in progress into a first split job that is the preceding section and a second split job that is the following section, outputs a set of the job identification information of the job in progress, the first split job, and the device identification information of the running device MFP 100A to end command transmitting portion 99, and outputs the second split job to split job changing portion 97.

Splitting portion 93 specifies the unprocessed section of the job in progress, based on the progress status of the job in progress input from progress status acquiring portion 96. If the size of the unprocessed section is equal to or smaller than a predetermined threshold T1, splitting portion 93 outputs nothing to split job changing portion 97 and end command transmitting portion 99.

Splitting portion 93 includes a predicting portion 94. Predicting portion 94 predicts the first time for the running device MFP 100A to execute the unprocessed section of the first split job and the second time for MFP 100B itself to execute the second split job, based on the ability information of the running device MFP 100A input from ability information acquiring portion 95, the ability information of the parallel running device MFP 100B itself, and the job in progress. Splitting portion 93 sets a plurality of sets of the first split job and the second split job by splitting the unprocessed section of the job in progress at a plurality of locations and decides on a set of the first split job and the second split job in which the difference between the first time and the second time predicted for each set by predicting portion 94 is smallest.

Split job changing portion 97 receives the raster data and the job identification information of the job in progress from raster data acquiring portion 91 and receives the second split job from splitting portion 93. Split job changing portion 97 replaces the print data included in the second split job with the raster data input from raster data acquiring portion 91. Split job changing portion 97 outputs the second split job including the raster data to job executing portion 55.

Job executing portion 55 includes a split job executing portion 83. In response to input of the second split job from split job changing portion 97, split job executing portion 83 executes the second split job. Specifically, split job executing portion 83 forms an image of the raster data included in the second split job on paper in accordance with the print condition included in the second split job.

End command transmitting portion 99 receives a set of the job identification information of the job in progress, the first split job, and the device identification information of the running device MFP 100A from splitting portion 93. End command transmitting portion 99 generates an end command from the job in progress specified by the job identification information and the first split job. End command transmitting portion 377 transmits the end command to the running device MFP 100A through communication I/F unit 112. The end command is a command that includes the job identification information of the job in progress to terminate the job in progress halfway. End command transmitting portion 99 specifies the last section of the first split job as the location where the job in progress is to be terminated. The running device MFP 100A receiving the end command stops execution of the job in progress specified by the job identification information included in the end command, at the location specified by the end command. The running device MFP 100A therefore will not execute the job in progress to the last, so that MFP 100A will not print a sheet with the same image as on a sheet output by the parallel running device MFP 100B executing the second split job.

Figure 12:
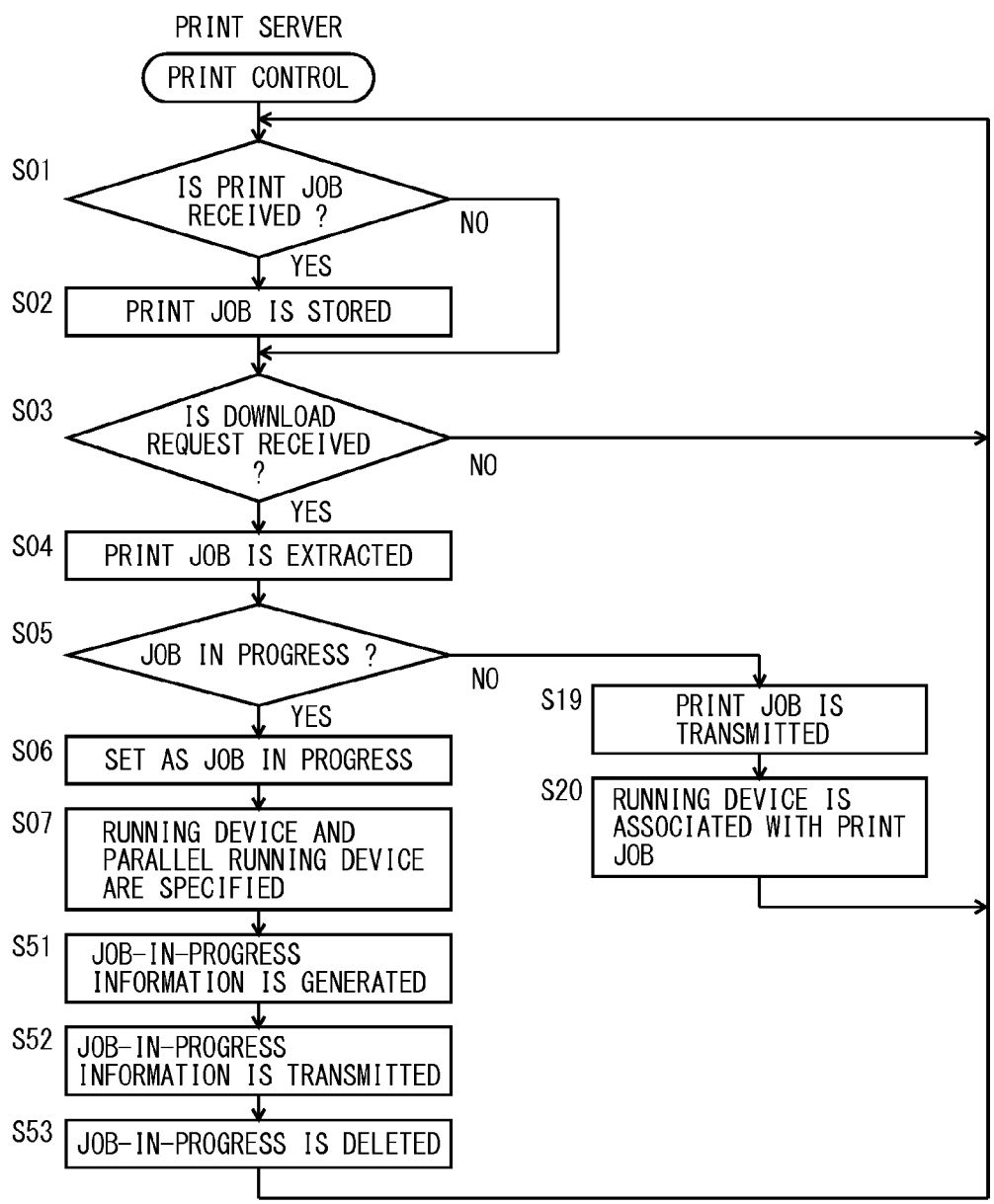
FIG. 12 is a flowchart showing an example of the procedure of a print control process in the second embodiment.

FIG. 12 is a flowchart showing an example of the procedure of a print control process in the second embodiment. The print control process in the second embodiment is a process executed by CPU 301 by CPU 301 of print server 300 executing the print control program. Referring to FIG. 12, the process differs from the process shown in FIG. 8 in that step S08 to step S18 are deleted and that step S51 to step S53 are added. The other processing is the same as the processing shown in FIG. 8 and a description thereof is not repeated here.

Referring to FIG. 12, in step S51, job-in-progress information is generated, which includes the print job set as a job in progress in step S06 and the device identification information of the running device. The job-in-progress information is then transmitted to the parallel running device (step S52). The print job set as a job in progress is deleted from HDD 305, and the process returns to step S01. This prevents the job in progress transmitted to the parallel running device from being extracted again next time when step S04 is performed.

Figure 13:
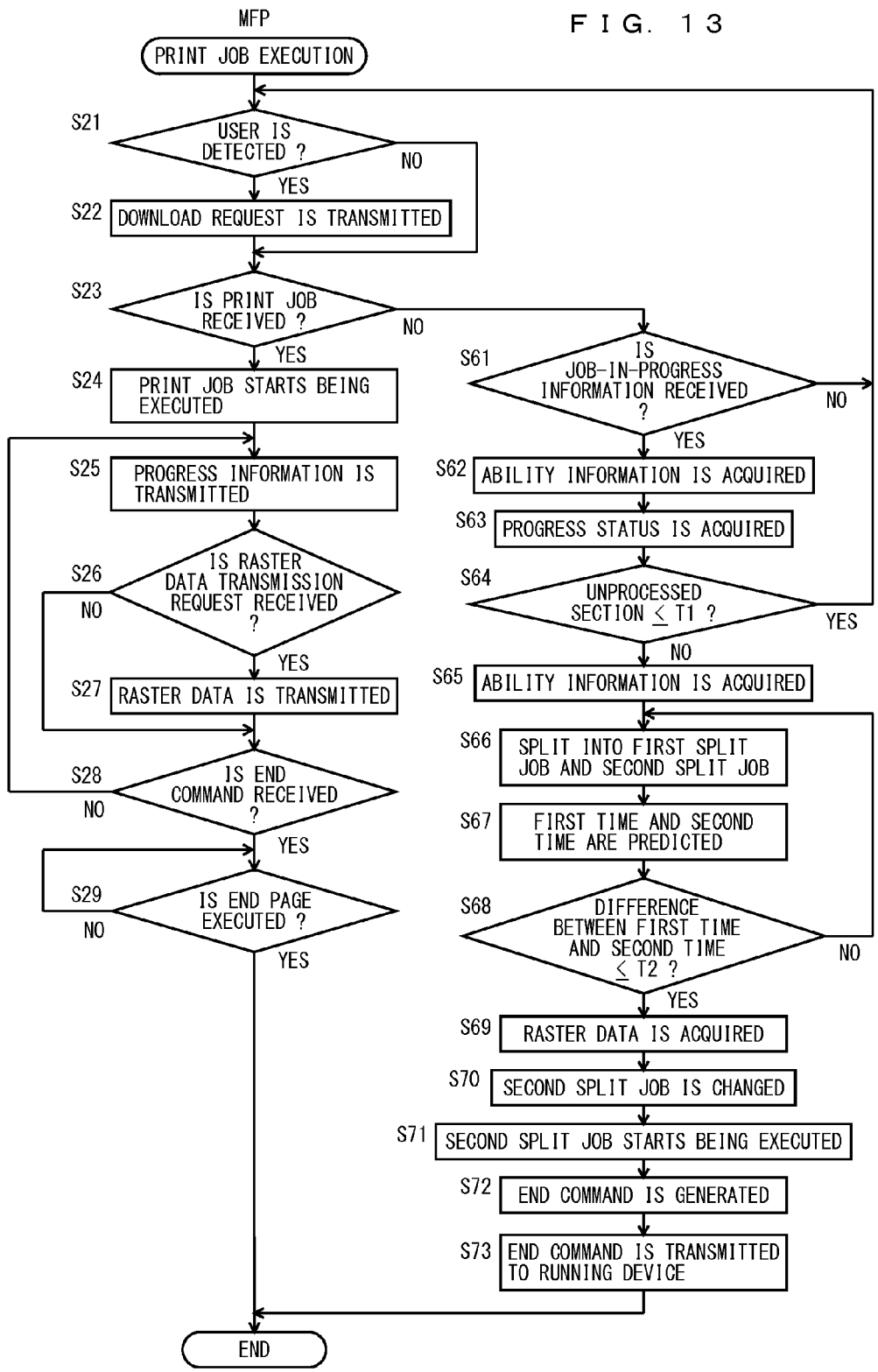
FIG. 13 is a flowchart showing an example of the procedure of a print job execution process in the second embodiment.

FIG. 13 is a flowchart showing an example of the procedure of a print job execution process in the second embodiment. The process differs from the print job execution process shown in FIG. 9 in that step S30 and step S31 are deleted and that step S61 to step S73 are added. The other processing is the same as the processing in FIG. 9 and a description thereof is not repeated here.

In step S61, it is determined whether job-in-progress information is received from print server 300. If job-in-progress information is received, the process proceeds to step S62. If not, the process returns to step S21. If the process proceeds to step S62, the parallel running device functions. Here, the processing after step S62 is executed by the parallel running device MFP 100B. The running device in this case is MFP 100A.

In step S63, the progress status of the job in progress is acquired. A transmission request including the job identification information of the job in progress included in the job-in-progress information is transmitted to MFP 100A specified by the device identification information of the running device included in the job-in-progress information, and the progress status of the job in progress sent from MFP 100A is received.

In the next step S63, the ability information of the running device MFP 100A is acquired from MFP 100A. The ability information is acquired by controlling communication I/F unit 112 to receive MIB from the running device MFP 100A. The ability information is here the number of sheets printed in a predetermined time.

In step S64, it is determined whether the unprocessed section of the job in progress is equal to or smaller than threshold T1, based on the progress status acquired in step S63. If the unprocessed section, which is obtained by subtracting the completed number of sheets from the scheduled number of sheets, is equal to or smaller than threshold T1, the process returns to step S21. If not, the process proceeds to step S65. This is because executing the unprocessed section in the running device MFP 100A may be faster than splitting the job in progress and executing the split job.

In the next step S66, the job in progress is split into a first split job and a second split job. The unprocessed section in which processing has not been executed in the job in progress is specified based on the progress status, and the unprocessed section is divided into two at any given location. The location of splitting is preferably determined based on the ability information of the running device and the ability information of the parallel running device. In the next step S67, the first time and the second time are predicted. The time for the running device to execute the unprocessed section of the first split job is predicted as the first time, and the time for the parallel running device to execute the second split job is predicted as the second time. It is then determined whether the difference between the first time and the second time is equal to or smaller than threshold T2 (step S68). If the difference between the first time and the second time is equal to or smaller than threshold T2, the process proceeds to step S71. If not, the process returns to step S66. In step S66, if the process proceeds from step S68, the location at which the job in progress is split is changed to a different location, and the job in progress is split into a first split job and a second split job at the different location.

In step S69, raster data is acquired from the running device, and the process proceeds to step S70. A raster data transmission request including the job identification information included in the job-in-progress information received in step S61 is transmitted to the running device, and raster data sent from the running device is received. The running device MFP 100A has converted the print data included in print job A into raster data when executing print job A as a job in progress. In the next step S70, the second split job is chanted, and the process proceeds to step S71. The print data included in the second split job is replaced with the raster data acquired in step S69.

In step S71, the second split job starts being executed, and the process proceeds to step S72. In step S72, an end command is generated. An end command to terminate the job in progress after the last section of the first split job is executed is generated based on the job in progress and the first split job. The end command includes the job identification information of the job in progress and the page number of the last page.

In the next step S73, the end command is transmitted to the running device, and the process returns to step S21.

Although the parallel running device MFP 100B splits the job in progress into a first split job and a second split job in the foregoing description, portable information device 200A may split the job in progress into a first split job and a second split job. In this case, portable information device 200A has the functions of the parallel running device MFP 100B in the second embodiment.

As described above, in response to reception of a download request from MFP 100A, the print server in the second embodiment transmits a print job that includes user identification information identical with the user identification information included in the download request to MFP 100A. At this stage, MFP 100A is the running device. Thereafter, in response to reception of a download request from MFP 100B, the print server transmits job-in-progress information including the job in progress and the device identification information of the running device MFP 100A to the parallel running device MFP 100B, if the print job transmitted to MFP 100A includes user identification information identical with the user identification information included in the download request received from MFP 100B and the progress status of the print job being executed in MFP 100A is in progress. MFP 100B receiving the job in progress acquires the progress status of the job in progress from the running device MFP 100A, splits the job in progress into a first split job that is the preceding section and a second split job that is the following section, based on the progress status of the job in progress, executes the second split job in MFP 100B itself serving as a parallel running device, generates an end command to terminate the job in progress at a location defined by the first split job, and transmits the end command to the running device MFP 100A. Therefore, part of the job in progress being executed in the running device MFP 100A is executed in the parallel running device MFP 100B, so that the job in progress can be finished earlier.

The parallel running device MFP 100B acquires raster data obtained by expanding the print data included in the job in progress from the running device MFP 100A, changes the print data included in the second split job to the acquired raster data, and executes the changed second split job. MFP 100B therefore does not have to generate raster data, thereby reducing the load on MFP 100B.

The first time for MFP 100A to execute the first split job and the second time for MFP 100B to execute the second split job are predicted, based on the image forming ability of the running device MFP 100A and the image forming ability of the parallel running device MFP 100B, and the first split job and the second split job in which the difference between the first time and the second time is smallest are determined. Therefore, the print job is finished at the running device MFP 100A and at the parallel running device MFP 100B at the same time as much as possible.

In the foregoing embodiments, print system 1 including print server 300 and MFP 100A, 100B, 100C as exemplary image forming apparatuses has been described. It is needless to say that the present invention can be understood as a print control method that allows print server 300 to execute the print control process in FIG. 8 and allows each of MFP 100A, 100B, 100C to execute the print job execution process in FIG. 9 and as a print control method that allows print server 300 to execute the print control process in FIG. 12 and allows each of MFP 100A, 100B, 100C to execute the print job execution process in FIG. 13.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print system comprising a print server and a plurality of image forming apparatuses,
   a hardware processor of the print server executing:
      a server-side receiving step of externally receiving a print job including user identification information for identifying a user and image data;
      a server-side extracting step of, in response to reception of a download request including user identification information from any one of the plurality of image forming apparatuses, extracting a print job that includes user identification information identical with the user identification information included in the received download request from among one or more print jobs received in the server-side receiving step;
      a print job transmitting step of transmitting the extracted print job to, among the plurality of image forming apparatuses, an image forming apparatus that has transmitted the download request;
      a progress status detecting step of detecting a progress status in which, among the plurality of image forming apparatuses, a first image forming apparatus that has received the print job executes the print job;
      a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress;

a splitting step of, if the job in progress is detected, splitting the job in progress into a first split job that is a preceding section and a second split job that is a following section, based on the progress status of the job in progress;

a split job transmitting step of transmitting the second split job to the second image forming apparatus; and an end command transmitting step of transmitting an end command to terminate the job in progress at a location defined by the first split job to the first image forming apparatus, a hardware processor of each of the plurality of image forming apparatuses executing:

a user detecting step of detecting a user;

a download request step of transmitting a download request including user identification information of the user detected in the user detecting step to the print server; and a job executing step of, if the print job is received from the print server in response to transmission of the download request, executing the print job, and if the second split job is received from the print server, executing the second split job, wherein the job executing step includes a job cancel step of terminating execution of the print job at a location defined by the end command if the end command is received from the print server while the print job is being executed.

2. A print system comprising a print server and a plurality of image forming apparatuses, a hardware processor of the print server executing:

a server-side receiving step of externally receiving a print job including user identification information for identifying a user and image data;

a server-side extracting step of, in response to reception of a download request including user identification information from any one of the plurality of image forming apparatuses, extracting a print job that includes user identification information identical with the user identification information included in the received download request from among one or more print jobs received in the server-side receiving step;

a print job transmitting step of, in response to reception of the download request from a first image forming apparatus among the plurality of image forming apparatuses, transmitting the extracted print job to the first image forming apparatus;

a progress status detecting step of detecting a progress status in which, among the plurality of image forming apparatuses, a first image forming apparatus that has received the print job executes the print job;

a job-in-progress detecting step of, in response to reception of a download request from a second image forming apparatus different from the first image forming apparatus among the plurality of image forming apparatuses, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress; and a job-in-progress information transmitting step of, if the job in progress is detected, transmitting job-in-progress information including the job in progress and device identification information for identifying the first image forming apparatus to the second image forming apparatus, a hardware processor of each of the plurality of image forming apparatuses executing:

a user detecting step of detecting a user;

a download request step of transmitting a download request including user identification information of the user detected in the user detecting step to the print server; and a job executing step of, if the print job is received from the print server in response to transmission of the download request, executing the print job, a hardware processor of the second image forming apparatus executing:

a progress status acquiring step of, if the job-in-progress information is received from the print server, acquiring a progress status of executing the job in progress from the first image forming apparatus specified by the device identification information included in the job-in-progress information;

a splitting step of splitting the job in progress into a first split job that is a preceding section and a second split job that is a following section, based on the acquired progress status of the job in progress;

a split job executing step of executing the second split job; and an end command transmitting step of transmitting an end command to terminate the job in progress at a location defined by the first split job to the first image forming apparatus, the hardware processor of the first image forming apparatus further executing a job cancel step of terminating execution of the job in progress at a location defined by the end command if the end command is received from the second image forming apparatus.

3. A print server comprising a hardware processor that executes:

a server-side receiving step of externally receiving a print job including user identification information for identifying a user and image data;

a server-side extracting step of, in response to reception of a download request including user identification information from any one of the plurality of image forming apparatuses, extracting a print job that includes user identification information identical with the user identification information included in the received download request from among one or more print jobs received in the server-side receiving step;

a print job transmitting step of transmitting the extracted print job to, among the plurality of image forming apparatuses, an image forming apparatus that has transmitted the download request;

a progress status detecting step of detecting a progress status in which, among the plurality of image forming apparatuses, a first image forming apparatus that has received the print job executes the print job;

a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress;

a splitting step of, if the job in progress is detected, splitting the job in progress into a first split job that is a preceding section and a second split job that is a following section, based on the progress status of the job in progress;

a split job transmitting step of transmitting the second split job to the second image forming apparatus; and an end command transmitting step of transmitting an end command to terminate the job in progress at a location defined by the first split job to the first image forming apparatus.

4. The print server according to claim 3, wherein the hardware processor further executes:

a raster data acquiring step of acquiring raster data from the first image forming apparatus, the raster data being formed by expanding print data included in the job in progress; and a split job changing step of changing print data included in the second split job to the acquired raster data, and the split job transmitting step includes a step of transmitting the second split job changed in the split job changing step to the second image forming apparatus.

5. The print server according to claim 3, wherein the splitting step includes a predicting step of predicting a first time for the first image forming apparatus to execute the first split job and a second time for the second image forming apparatus to execute the second split job, based on an image forming ability of the first image forming apparatus, an image forming ability of the second image forming apparatus, and an unexecuted process of the job in progress, and a step of determining the first split job and the second split job in which a difference between the first time and the second time is smallest.

6. A print control method performed in a print server, comprising:

a server-side receiving step of externally receiving a print job including user identification information for identifying a user and image data;

a server-side extracting step of, in response to reception of a download request including user identification information from any one of a plurality of image forming apparatuses, extracting a print job that includes user identification information identical with the user identification information included in the received download request from among one or more print jobs received in the server-side receiving step;

a print job transmitting step of transmitting the extracted print job to, among the plurality of image forming apparatuses, an image forming apparatus that has transmitted the download request;

a progress status detecting step of detecting a progress status in which, among the plurality of image forming apparatuses, a first image forming apparatus that has received the print job executes the print job;

a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress;

a splitting step of, if the job in progress is detected, splitting the job in progress into a first split job that is a preceding section and a second split job that is a following section, based on the progress status of the job in progress;

a split job transmitting step of transmitting the second split job to the second image forming apparatus; and a command transmitting step of transmitting an end command to terminate the job in progress at a location defined by the first split job to the first image forming apparatus.

7. The print control method according to claim 6, further comprising:

a raster data acquiring step of acquiring raster data from the first image forming apparatus, the raster data being formed by expanding print data included in the job in progress; and a split job changing step of changing print data included in the second split job to the acquired raster data, wherein the split job transmitting step includes a step of transmitting the second split job changed in the split job changing step to the second image forming apparatus.

8. The print control method according to claim 6, wherein the splitting step includes a predicting step of predicting a first time for the first image forming apparatus to execute the first split job and a second time for the second image forming apparatus to execute the second split job, based on an image forming ability of the first image forming apparatus, an image forming ability of the second image forming apparatus, and an unexecuted process of the job in progress, and a step of determining the first split job and the second split job in which a difference between the first time and the second time is smallest.

9. A non-transitory computer-readable recording medium encoded with a print control program executed in a computer that controls a print server, the program causing the computer to execute:

a server-side receiving step of externally receiving a print job including user identification information for identifying a user and image data;

a server-side extracting step of, in response to reception of a download request including user identification information from any one of a plurality of image forming apparatuses, extracting a print job that includes user identification information identical with the user identification information included in the received download request from among one or more print jobs received in the server-side receiving step;

a print job transmitting step of transmitting the extracted print job to, among the plurality of image forming apparatuses, an image forming apparatus that has transmitted the download request;

a progress status detecting step of detecting a progress status in which, among the plurality of image forming apparatuses, a first image forming apparatus that has received the print job executes the print job;

a job-in-progress detecting step of, in response to reception of a download request from a second image forming apparatus different from the first image forming apparatus, detecting the print job transmitted to the first image forming apparatus as a job in progress, if the print job transmitted to the first image forming apparatus includes user identification information identical with user identification information included in the download request received from the second image forming apparatus and the progress status detected in the progress status detecting step of the print job executed in the first image forming apparatus is in progress;

a splitting step of, if the job in progress is detected, splitting the job in progress into a first split job that is a preceding section and a second split job that is a following section, based on the progress status of the job in progress;

a split job transmitting step of transmitting the second split job to the second image forming apparatus; and a command transmitting step of transmitting an end command to terminate the job in progress at a location defined by the first split job to the first image forming apparatus.

10. The non-transitory computer-readable recording medium encoded with a print control program according to claim 9, further causing the computer to execute:

a raster data acquiring step of acquiring raster data from the first image forming apparatus, the raster data being formed by expanding print data included in the job in progress; and a split job changing step of changing print data included in the second split job to the acquired raster data, wherein the split job transmitting step includes a step of transmitting the second split job changed in the split job changing step to the second image forming apparatus.

11. The non-transitory computer-readable recording medium encoded with a print control program according to claim 9, wherein the splitting step includes a predicting step of predicting a first time for the first image forming apparatus to execute the first split job and a second time for the second image forming apparatus to execute the second split job, based on an image forming ability of the first image forming apparatus, an image forming ability of the second image forming apparatus, and an unexecuted process of the job in progress, and a step of determining the first split job and the second split job in which a difference between the first time and the second time is smallest.

12. An image forming apparatus comprising a hardware processor, wherein the hardware processor executes:

a user detecting step of detecting a user;

a download request step of transmitting a download request including user identification information of the user detected in the user detecting step to a print server;

a job executing step of, if a print job is received from the print server in response to transmission of the download request, executing the print job, a progress status acquiring step of, if job-in-progress information including a job-in-progress as a print job being executed in another first image forming apparatus and device identification information for identifying the first image forming apparatus is received from the print server in response to transmission of the download request, acquiring a progress status of executing the job in progress from the first image forming apparatus specified by the device identification information included in the first job-in-progress information;

a splitting step of splitting the job in progress into a first split job that is a preceding section and a second split job that is a following section, based on the acquired progress status of the job in progress;

a split job executing step of executing the second split job;

an end command transmitting step of transmitting a first end command to terminate the job in progress at a location defined by the first split job to the first image forming apparatus; and a job cancel step of, if a second end command is received from another second image forming apparatus receiving from the print server job information of a second job in progress including the print job in progress in the job executing step, terminating execution of the print job in progress in the job executing step at a location defined by the second end command.

13. A print control method executed by an image forming apparatus, comprising:

a user detecting step of detecting a user;

a download request step of transmitting a download request including user identification information of the user detected in the user detecting step to a print server;

a job executing step of, if a print job is received from the print server in response to transmission of the download request, executing the print job, a progress status acquiring step of, if first job-in-progress information including a job-in-progress as a print job being executed by another first image forming apparatus and device identification information for identifying the first image forming apparatus is received from the print server in response to transmission of the download request, acquiring a progress status of executing the job-in-progress from the first image forming apparatus specified by the device identification information included in the first job-in-progress information;

a splitting step of splitting the job-in-progress into a first split job that is a preceding section and a second split job that is a following section, based on the acquired progress status of executing the job-in-progress;

a split job executing step of executing the second split job;

an end command transmitting step of transmitting a first end command to terminate the job-in-progress at a location defined by the first split job to the first image forming apparatus; and a job cancel step of, if a second end command is received from another second image forming apparatus receiving from the print server second job-in-progress information including the print job being executed in the job executing step, terminating execution of the print job-in-progress in the job executing step at a location defined by the second end command.

* * * * *